United States Patent
Ray et al.

(10) Patent No.: US 11,941,855 B2
(45) Date of Patent: Mar. 26, 2024

(54) CODING OF LASER ANGLES FOR ANGULAR AND AZIMUTHAL MODES IN GEOMETRY-BASED POINT CLOUD COMPRESSION

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Louis Joseph Kerofsky, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/224,653

(22) Filed: Apr. 7, 2021

(65) Prior Publication Data
US 2021/0327098 A1 Oct. 21, 2021

Related U.S. Application Data

(60) Provisional application No. 63/036,799, filed on Jun. 9, 2020, provisional application No. 63/009,940, filed
(Continued)

(51) Int. Cl.
*G06T 9/40* (2006.01)
*G01S 7/481* (2006.01)
(Continued)

(52) U.S. Cl.
CPC .............. *G06T 9/40* (2013.01); *G01S 7/4817* (2013.01); *G01S 17/89* (2013.01); *G06T 7/10* (2017.01);
(Continued)

(58) Field of Classification Search
CPC ........ A01M 1/026; A01M 1/06; A01M 1/223; A01M 1/14; A01M 1/2022; A01M 5/00;
(Continued)

(56) References Cited

U.S. PATENT DOCUMENTS 10,796,457 B2  10/2020  Beek
10,902,160 B2   1/2021  Wodrich et al.
(Continued)

FOREIGN PATENT DOCUMENTS

EP       3800892 A1   4/2021
WO    2020189982 A1   9/2020
(Continued)

OTHER PUBLICATIONS

Anton B., et al., "Hardware Accelerated Compression of LIDAR Data Using FPGA Devices", Sensors, vol. 13. No. 5. Jan. 1, 2013 (Jan. 1, 2013), pp. 6405-6422. XP055810176. DOI: 10.3390/s130506405, Retrieved from the Internet: URL: page>https://www.ncbi.nlm.nih.gov/pmc/articles/PMC3690063/pdf/sensors-13-06405.pdf, pp. 6411, paragraph 4.1.4, p. 6409, paragraph 4.1.
(Continued)

*Primary Examiner* — Stephen P Coleman
(74) *Attorney, Agent, or Firm* — QUALCOMM Incorporated; Espartaco Diaz Hidalgo

(57) ABSTRACT

A device comprises one or more processors configured to: obtain a value for a first laser, the value for the first laser indicating a number of probes in an azimuth direction of the first laser; decode a syntax element for a second laser, wherein the syntax element for the second laser indicates a difference between the value for the first laser and a value for the second laser, the value for the second laser indicating a number of probes in the azimuth direction of the second laser; determine the value for the second laser indicating the number of probes in the azimuth direction of the second
(Continued)

laser based on the first value and the indication of the difference between the value for the first laser and the value for the second laser; and decode a point based on the number of probes in the azimuth direction of the second laser.

26 Claims, 12 Drawing Sheets

Related U.S. Application Data on Apr. 14, 2020, provisional application No. 63/007,282, filed on Apr. 8, 2020.

(51) Int. Cl.
*G01S 17/89* (2020.01)
*G06T 7/10* (2017.01)
*G06T 7/50* (2017.01)
*H04N 19/96* (2014.01)

(52) U.S. Cl.
CPC ............... *G06T 7/50* (2017.01); *H04N 19/96* (2014.11); *G06T 2207/10028* (2013.01)

(58) Field of Classification Search
CPC ........... A01M 1/226; A01M 2200/012; G06V 10/40; G06V 20/52; G06N 20/00
USPC ........................................................ 382/100
See application file for complete search history.

(56) References Cited

U.S. PATENT DOCUMENTS

| | | | |
|---|---|---|---|
| 11,429,761 | B2 | 8/2022 | Wodrich et al. |
| 11,625,510 | B2 | 4/2023 | Wodrich et al. |
| 2010/0128259 | A1* | 5/2010 | Bridges .................. G01S 17/66 356/138 |
| 2019/0103177 | A1 | 4/2019 | Matthews |
| 2019/0108655 | A1 | 4/2019 | Lasserre et al. |
| 2019/0116215 | A1 | 4/2019 | Oesterreicher |
| 2019/0116357 | A1 | 4/2019 | Tian et al. |
| 2020/0021817 | A1 | 1/2020 | Van Der Auwera et al. |
| 2021/0312670 | A1 | 10/2021 | Mammou et al. |
| 2022/0130075 | A1 | 4/2022 | Oh et al. |
| 2022/0353549 | A1 | 11/2022 | Lasserre et al. |
| 2022/0358686 | A1 | 11/2022 | Lasserre et al. |
| 2022/0366612 | A1 | 11/2022 | Taquet et al. |
| 2023/0162406 | A1 | 5/2023 | Ramasubramonian |

FOREIGN PATENT DOCUMENTS

| | | |
|---|---|---|
| WO | 2021207431 A1 | 10/2021 |
| WO | 2021207502 A1 | 10/2021 |

OTHER PUBLICATIONS

Co-pending U.S. Appl. No. 17/224,551, inventor Van der Auwera; Geert, filed Apr. 7, 2021.
Co-pending U.S. Appl. No. 17/224,608, inventor Van der Auwera; Geert, filed Apr. 7, 2021.
Co-pending U.S. Appl. No. 17/224,709, inventor Van der Auwera; Geert, filed Apr. 7, 2021.
International Search Report and Written Opinion—PCT/US2021/026391—ISA/EPO—dated Jul. 1, 2021.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
Lasserre S., et al., "CE 13.22 Report on Angular Mode", m51594, BlackBerry, 2016, 33 Pages.
Graziosi D., et al., "An Overview of Ongoing Point Cloud Compression Standardization Activities: Video-Based (V-PCC) and Geometry-Based(G-PCC)", Industrial Technology Advances, SIP, vol. 9, No. e13, Apr. 2020, pp. 1-17.
Schwarz S., et al., "Emerging MPEG Standards for Point Cloud Compression", IEEE Journal on Emerging and Selected Topics in Circuits and Systems, Piscataway, NJ, USA, vol. 9, No. 1, Mar. 30, 2019, pp. 133-148, XP011714044, ISSN: 2156-3357.
Sun X., et al., "A Novel Point Cloud Compression Algorithm Based on Clustering", IEEE Robotics and Automation Letters, Preprint Version, Accepted Jan. 2019, pp. 1-8.
3DG: "G-PCC Codec Description v5", Coding of Moving Pictures and Audio, ISO/IEC JTC1/SC29/WG11, N18891, Oct. 2019, Geneva, CH, Dec. 13, 2019, 75 pages, XP030225589, Retrieved from the Internet: URL: http://phenix.int-evry.fr/mpeg/doc_end_user/documents/128_Geneva/wg11/w18891.zip w18891.docx—[retrieved on Dec. 18, 2019].
Auwera (Qualcomm) G.V.D., et al., "[GPCC] [New Proposal] Angular Mode Simplifications and HLS Refinements", 130. MPEG Meeting, Apr. 20, 2020-Apr. 24, 2020, Alpbach, (Motion Picture Expert Group or ISO/IEC JTC1/SC29/WG11), No. m53693, Apr. 15, 2020, XP030287372, 12 Pages.
Lasserre (Blackberry) S., et al., "[GPCC] [CE 13.22 Related] An Improvement of the Planar Coding Mode", 128. MPEG Meeting, Oct. 7, 2019-Oct. 11, 2019, Geneva, (Motion Picture Expert Group or ISO/IEC JTC1/SC29/WG11), No. m50642, Oct. 2, 2019, XP030221087, 3 Pages.
Lasserre (Blackberry) S., et al., "[GPCC] [CE 13.22] Report on Angular Coding Mode", 129. MPEG Meeting, Jan. 13, 2020-Jan. 17, 2020, Brussels, (Motion Picture Expert Group or ISO/IEC JTC1/SC29/WG11), No. M51594, Jan. 8, 2020 (Jan. 8, 2020), XP030224658, 4 Pages.
Lasserre (Blackberry) S., et al., "The Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages.
Ray, B., (Qualcomm), et al., "[G-PCC] [new] Angular HLS Improvement and Bugfix", 131. MPEG Meeting, Jun. 29, 2020-Jul. 3, 2020, Online, (Motion Picture Expert Group or ISO/IEC JTC1/SC29/WG11), No. m54702, Jun. 23, 2020 (Jun. 23, 2020), XP030289275, 8 Pages.
Tulvan C., et al., "Use Cases for Point Cloud Compression (PCC)", 115th MPEG Meeting, May 30, 2016-Jun. 3, 2016, Geneva, CH (Motion Picture Expert Group or ISO/IEC JTC1/SC29/WG11), No. N16331, Jun. 5, 2016, XP030269821, 8 Pages.

* cited by examiner

CODING OF LASER ANGLES FOR ANGULAR AND AZIMUTHAL MODES IN GEOMETRY-BASED POINT CLOUD COMPRESSION

This application claims the benefit of U.S. Provisional Patent Application 63/007,282, filed Apr. 8, 2020, U.S. Provisional Patent Application 63/009,940, filed Apr. 14, 2020, and U.S. Provisional Patent Application 63/036,799, filed Jun. 9, 2020, the entire content of each of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for coding of laser angles for angular and azimuthal modes in the Geometry-based Point Cloud Compression (G-PCC) standard that is being developed within the 3-dimensional graphics (3DG) working group of the Motion Picture Experts Group (MPEG). The G-PCC standard provides for syntax elements related to angular and azimuthal modes. These syntax elements include syntax elements indicating laser angles for individual laser beams and syntax elements indicating numbers of probes in an azimuth direction, e.g., during a full rotation of a laser beam or other range of angles of the laser beam. This disclosure describes techniques that may improve coding efficiency of such syntax elements.

In one example, this disclosure describes a device comprising: a memory configured to store point cloud data; and one or more processors coupled to the memory and implemented in circuitry, the one or more processors configured to: obtain a first laser angle; obtain a second laser angle; obtain a laser angle difference for a third laser angle; determine a predicted value based on the first laser angle and the second laser angle; and determine the third laser angle based on the predicted value and the laser angle difference for the third laser angle.

In another example, this disclosure describes a device comprising: a memory configured to store point cloud data; and one or more processors coupled to the memory and implemented in circuitry, the one or more processors configured to: obtain a first laser angle; obtain a second laser angle; determine a predicted value based on the first laser angle and the second laser angle; and encode a laser angle difference for a third laser angle, wherein the laser angle difference is equal to a difference between the third laser angle and the predicted value.

In another example, this disclosure describes a method comprising: obtaining a first laser angle; obtaining a second laser angle; obtaining a laser angle difference for a third laser angle; determining a predicted value based on the first laser angle and the second laser angle; and determining the third laser angle based on the predicted value and the laser angle difference for the third laser angle.

In another example, this disclosure describes a method comprising: obtaining a first laser angle; obtaining a second laser angle; determining a predicted value based on the first laser angle and the second laser angle; and encoding a laser angle difference for a third laser angle, wherein the laser angle difference is equal to a difference between the third laser angle and the predicted value.

In another example, this disclosure describes a device comprising: means for obtaining a first laser angle; means for obtaining a second laser angle; means for obtaining a laser angle difference for a third laser angle; means for determining a predicted value based on the first laser angle and the second laser angle; and means for determining the third laser angle based on the predicted value and the laser angle difference for the third laser angle.

In another example, this disclosure describes a device comprising: means for obtaining a first laser angle; means for obtaining a second laser angle; means for determining a predicted value based on the first laser angle and the second laser angle; and means for encoding a laser angle difference for a third laser angle, wherein the laser angle difference is equal to a difference between the third laser angle and the predicted value.

In another example, this disclosure describes a computer-readable storage medium having stored thereon instructions that, when executed, cause one or more processors to: obtain a first laser angle; obtain a second laser angle; obtain a laser angle difference syntax element for a third laser angle, wherein the laser angle difference syntax element indicates a laser angle difference for the third laser angle; determine a predicted value based on the first laser angle and the second laser angle; and determine the third laser angle based on the predicted and the laser angle difference for the third laser angle.

In another example, this disclosure describes a computer-readable storage medium having stored thereon instructions that, when executed, cause one or more processors to: obtain a first laser angle; obtain a second laser angle; determine a predicted value based on the first laser angle and the second laser angle; and encode a laser angle difference for a third laser angle, wherein the laser angle difference is equal to a difference between the third laser angle and the predicted value.

In another example, this disclosure describes a device comprising: a memory configured to store point cloud data; and one or more processors coupled to the memory and implemented in circuitry, the one or more processors configured to: obtain a value for a first laser, the value for the first laser indicating a number of probes in an azimuth direction of the first laser; decode a syntax element for a second laser, wherein the syntax element for the second laser indicates a difference between the value for the first laser and a value for the second laser, the value for the second laser indicating a number of probes in the azimuth direction of the second laser; determine the value for the second laser indicating the number of probes in the azimuth direction of the second laser based on the first value and the indication of the difference between the value for the first laser and the value for the second laser; and decode a point of the point cloud data based on the number of probes in the azimuth direction of the second laser.

In another example, this disclosure describes a device comprising a memory configured to store point cloud data; and one or more processors coupled to the memory and implemented in circuitry, the one or more processors configured to: obtain the point cloud data; determine a value for a first laser, the value for the first laser indicating a number of probes in an azimuth direction of the first laser; encode a syntax element for a second laser, wherein the syntax element for the second laser indicates a difference between the value for the first laser and a value for the second laser, the value for the second laser indicating a number of probes in the azimuth direction of the second laser; and encode a point of the point cloud data based on the number of probes in the azimuth direction of the second laser.

In another example, this disclosure describes a method of encoding point cloud data, the method comprising: obtaining the point cloud data; determining a value for a first laser, the value for the first laser indicating a number of probes in an azimuth direction of the first laser; encoding a syntax element for a second laser, wherein the syntax element for the second laser indicates a difference between the value for the first laser and a value for the second laser, the value for the second laser indicating a number of probes in the azimuth direction of the second laser; and encoding a point of the point cloud data based on the number of probes in the azimuth direction of the second laser.

In another example, this disclosure describes a device for decoding point cloud data, the device comprising: means for obtaining a value for a first laser, the value for the first laser indicating a number of probes in an azimuth direction of the first laser; means for decoding a syntax element for a second laser, wherein the syntax element for the second laser indicates a difference between the value for the first laser and a value for the second laser, the value for the second laser indicating a number of probes in the azimuth direction of the second laser; means for determining the value for the second laser indicating the number of probes in the azimuth direction of the second laser based on the first value and the indication of the difference between the value for the first laser and the value for the second laser; and means for decoding a point of the point cloud data based on the number of probes in the azimuth direction of the second laser.

In another example, this disclosure describes a device for encoding point cloud data, the device comprising: means for obtaining the point cloud data; means for determining a value for a first laser, the value for the first laser indicating a number of probes in an azimuth direction of the first laser; means for encoding a syntax element for a second laser, wherein the syntax element for the second laser indicates a difference between the value for the first laser and a value for the second laser, the value for the second laser indicating a number of probes in the azimuth direction of the second laser; and means for encoding a point of the point cloud data based on the number of probes in the azimuth direction of the second laser.

In another example, this disclosure describes a computer-readable storage medium having stored thereon instructions that, when executed, cause one or more processors to: obtain a value for a first laser, the value for the first laser indicating a number of probes in an azimuth direction of the first laser; decode a syntax element for a second laser, wherein the syntax element for the second laser indicates a difference between the value for the first laser and a value for the second laser, the value for the second laser indicating a number of probes in the azimuth direction of the second laser; determine the value for the second laser indicating the number of probes in the azimuth direction of the second laser based on the first value and the indication of the difference between the value for the first laser and the value for the second laser; and decode a point of point cloud data based on the number of probes in the azimuth direction of the second laser.

In another example, this disclosure describes a computer-readable storage medium having stored thereon instructions that, when executed, cause one or more processors to: obtain point cloud data; determine a value for a first laser, the value for the first laser indicating a number of probes in an azimuth direction of the first laser; and encode a syntax element for a second laser, wherein the syntax element for the second laser indicates a difference between the value for the first laser and a value for the second laser, the value for the second laser indicating a number of probes in the azimuth direction of the second laser; and encode a point of the point cloud based on the number of probes in the azimuth direction of the second laser.

The details of one or more examples are set forth in the accompanying drawings and the description below. Other features, objects, and advantages will be apparent from the description, drawings, and claims.

DETAILED DESCRIPTION

Figure 1:
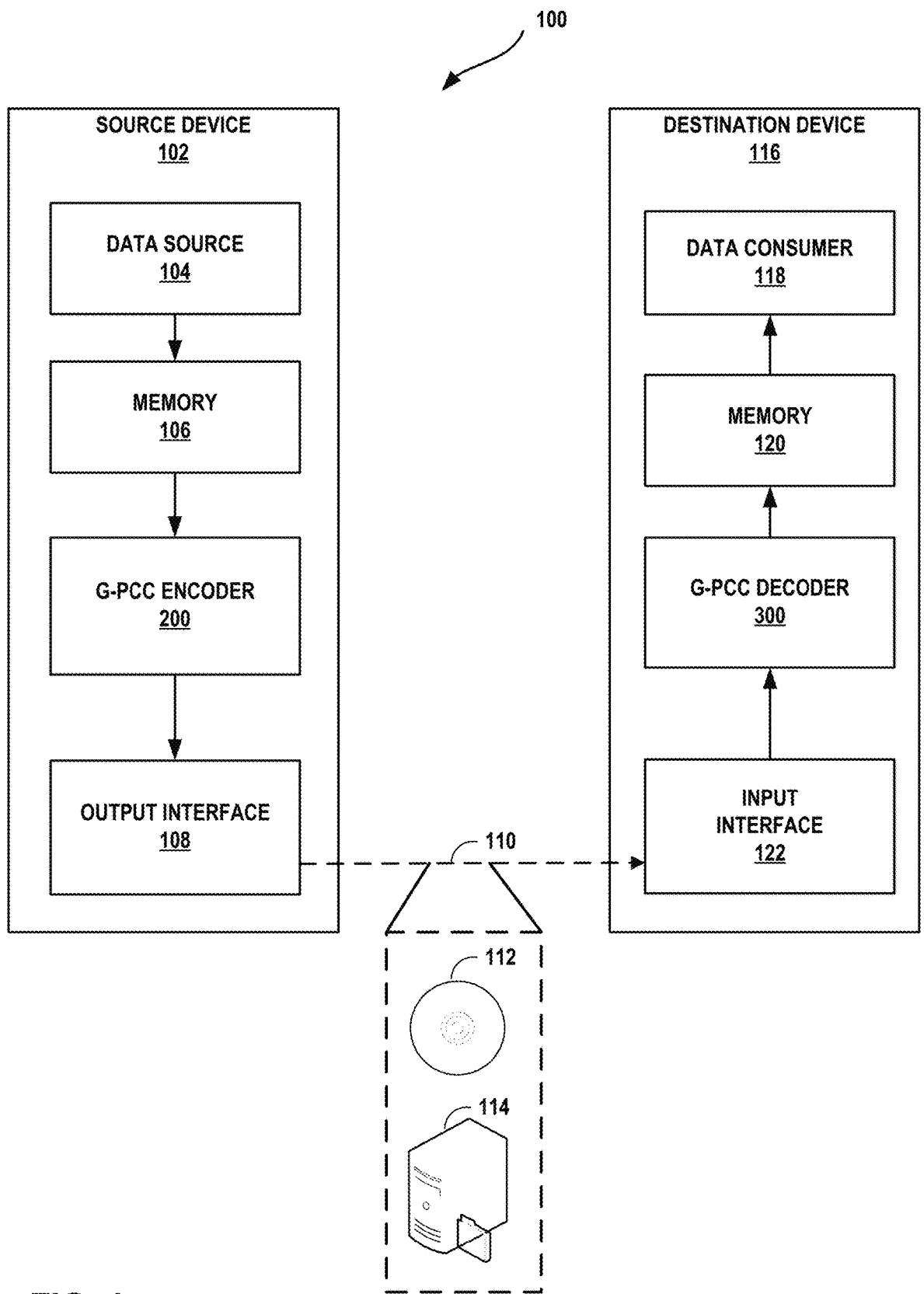
FIG. 1 is a block diagram illustrating an example encoding and decoding system that may perform the techniques of this disclosure.

A point cloud is a collection of points in a 3-dimensional (3D) space. Geometry-based point cloud compression (G-PCC) is an approach for reducing the amount of data needed to store point clouds. As part of encoding a point cloud, a G-PCC encoder may generate an octree. Each node of the octree corresponds to a cuboid space. For ease of explanation, this disclosure may, in some circumstances, refer to a node and the cuboid space corresponding to the node interchangeably. Nodes of the octree can have zero child nodes or eight child nodes. The child nodes of a parent node correspond to equally sized cuboids within the cuboid corresponding to the parent node. The positions of individual points of a point cloud can be coded relative to nodes containing the points. If a node does not contain any points of the point cloud, the node is said to be unoccupied. If the node is unoccupied, it may not be necessary to code additional data with respect to the node. Conversely, if a node contains one or more points of the point cloud, the node is said to be occupied. Nodes may be further subdivided into voxels. The G-PCC encoder may indicate the positions of individual points within a point cloud by indicating locations of voxels occupied by points of the point cloud.

G-PCC provides multiple coding tools to code the locations of occupied voxels within a node. These coding tools include an angular coding mode and an azimuthal coding mode. The angular coding mode is based on a set of laser beams arranged in a fan pattern. The laser beams may correspond to real laser beams (e.g., of a LIDAR device) or may be conceptual. The G-PCC encoder may encode angles between the laser beams in a high-level syntax structure. A location of a point within a node may only be coded using the angular coding mode if only one of the laser beams intersects the node. When the location of a point in a node is coded using the angular coding mode, the G-PCC encoder determine a vertical offset between a position of the point and an origin point of the node. The G-PCC encoder may determine a context based on a position of a laser beam relative to a marker point (e.g., center point) of the node. The G-PCC encoder may apply context-adaptive arithmetic coding (CABAC) using the determined context to encode one or more bins of a syntax element indicating the vertical offset.

When the location of a point is coded using the azimuthal coding mode, the G-PCC encoder may determine a context based on an azimuthal sampling location of a laser beam within a node. The G-PCC encoder may apply CABAC using the determined context to encode a syntax element indicating an azimuthal offset of the point.

Use of the angular and azimuthal modes may deliver higher coding efficiency in some circumstances because information about how the laser beam intersects a node may improve the selection of contexts for encoding syntax elements indicating vertical and azimuthal offsets. Improved selection of contexts may result in greater compression in the CABAC encoding process.

However, use of the angular mode may depend on knowing the vertical angles of the laser beams relative to one another. Accordingly, the G-PCC encoder may need to code the angles between the laser beams. Similarly, use of the azimuthal mode may depend on knowing the angles between azimuthal sampling locations. Accordingly, the G-PCC encoder may need to code the number of azimuthal sampling locations per turn for individual laser beams. However, coding of the angles between the laser beams and coding the number of azimuthal sampling locations per turn per laser beam may increase the coding overhead of a G-PCC geometry bitstream.

This disclosure describes techniques that may improve the coding efficiency when coding laser angles and/or the number of azimuthal sampling locations per turn. For example, this disclosure describes a method of decoding point cloud data in which a G-PCC decoder obtains a first laser angle, obtains a second laser angle, and obtains a laser angle difference for a third laser angle. In this example, the G-PCC decoder may determine a predicted value based on the first laser angle and the second laser angle. The G-PCC decoder may determine the third laser angle based on the predicted value and the laser angle difference for the third laser angle. Based on one of the first laser angle, the second laser angle and the third laser angle, the G-PCC decoder may decode a point of the point cloud data. For instance, the GPCC decoder may be arranged for decoding point cloud data using the third laser angle. In some examples, the G-PCC decoder may determine a vertical position of a point of the point cloud data based on the third laser angle. By determining the third laser angle based on the first and second laser angles, the amount of data necessary for specifying the laser angle difference may become smaller than if the G-PCC decoder did not determine the third laser angle based on the first and second laser angles. Thus, the laser angle difference may be coded more efficiently.

In another example, this disclosure describes a method of decoding point cloud data in which a G-PCC decoder obtains a value for a first laser. The value for the first laser indicates a number of probes in an azimuth direction of the first laser (e.g., for one full rotation of the first laser or other range). The G-PCC decoder may also decode a syntax element for a second laser. The syntax element for the second laser indicates a difference between the value for the first laser and a value for the second laser. The value for the second laser indicates a number of probes in the azimuth direction of the second laser (e.g., for one full rotation of the first laser or other range). Additionally, the G-PCC decoder may determine the value for the second laser indicating the number of probes in the azimuth direction of the second laser based on the first value and the indication of the difference between the value for the first laser and the value for the second laser. In other words, based on the value for the first laser and the indication of the difference between the value for the first laser and the value for the second laser, the G-PCC decoder may determine the value for the second laser indicating a number of probes in the azimuth direction of the second laser. The G-PCC decoder may decode a point of the point cloud data based on the number of probes in the azimuth direction of the second laser. For instance, the G-PCC decoder may be arranged for decoding point cloud data using the number of probes in the azimuth direction of the second laser. By determining the number of probes in the azimuth direction of the second laser based on a difference between the value for the first laser and a value for the second laser, the amount of data necessary for specifying the number of probes in the azimuthal direction for the second laser becomes smaller, thus more efficient than directly indicating the number of probes.

Although this disclosure describes lasers, laser beams, laser candidates, and other terms involving lasers, these terms are not necessarily limited to instances in which physical lasers are used. Rather, these terms may be used with respect to physical lasers or other range-finding technologies. Moreover, these terms may be used with respect to beams that do not physically exist but the concept of the beam is used for purposes of coding point clouds.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, surveillance or security equipment, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. G-PCC encoder 200 of source device 102 and G-PCC decoder 300 of destination device 116 may be configured to apply the techniques of this disclosure related to simplifications for G-PCC angular modes. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to simplifications for G-PCC angular modes. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. Similarly, the term "coding" may refer to either of encoding or decoding. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. In this way, data source 104 may generate a point cloud. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud. In other words, memory 106 and memory 120 may be configured to store point cloud data.

Computer-readable medium 110 may represent any type of medium or device capable of transporting the encoded data from source device 102 to destination device 116. In one example, computer-readable medium 110 represents a communication medium to enable source device 102 to transmit encoded data (e.g., encoded point cloud) directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a web site), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

In some examples, source device 102 and/or destination device 116 are mobile devices, such as mobile phones, augmented reality (AR) devices, or mixed reality (MR) devices. In such examples, source device 102 may generate and encode a point cloud as part of a process to map the local environment of source device 102. With respect to AR and MR examples, destination device 116 may use the point cloud to generate a virtual environment based on the local environment of source device 102. In some examples, source device 102 and/or destination device 116 are terrestrial or marine vehicles, spacecraft, or aircraft. In such examples, source device 102 may generate and encode a point cloud as part of a process to map an environment of the source device, e.g., for purposes of autonomous navigation, crash forensics, and other purposes.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud. For example, data consumer 118 may use points of the point cloud as vertices of polygons and may use color attributes of points of the point cloud to shade the polygons. In this example, data consumer 118 may then rasterize the polygons to present computer-generated images based on the shaded polygons.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and projects the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020 (hereinafter, "w19088"), and a description of the codec is available in G-PCC Codec Description v6, ISO/IEC JTC1/SC29/WG11 w19091, Brussels, Belgium, January 2020 (hereinafter, "w19091").

A point cloud contains a set of points in a 3D space and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), the automotive industry (LIDAR sensors used to help in navigation), in mobile phones, in tablet computers, and in other scenarios.

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on the number of points in each partition, or based on other considerations (e.g., a particular region may be coded as tiles). The slice regions may be further partitioned using splitting decisions similar to those in video codecs.

Figure 2:
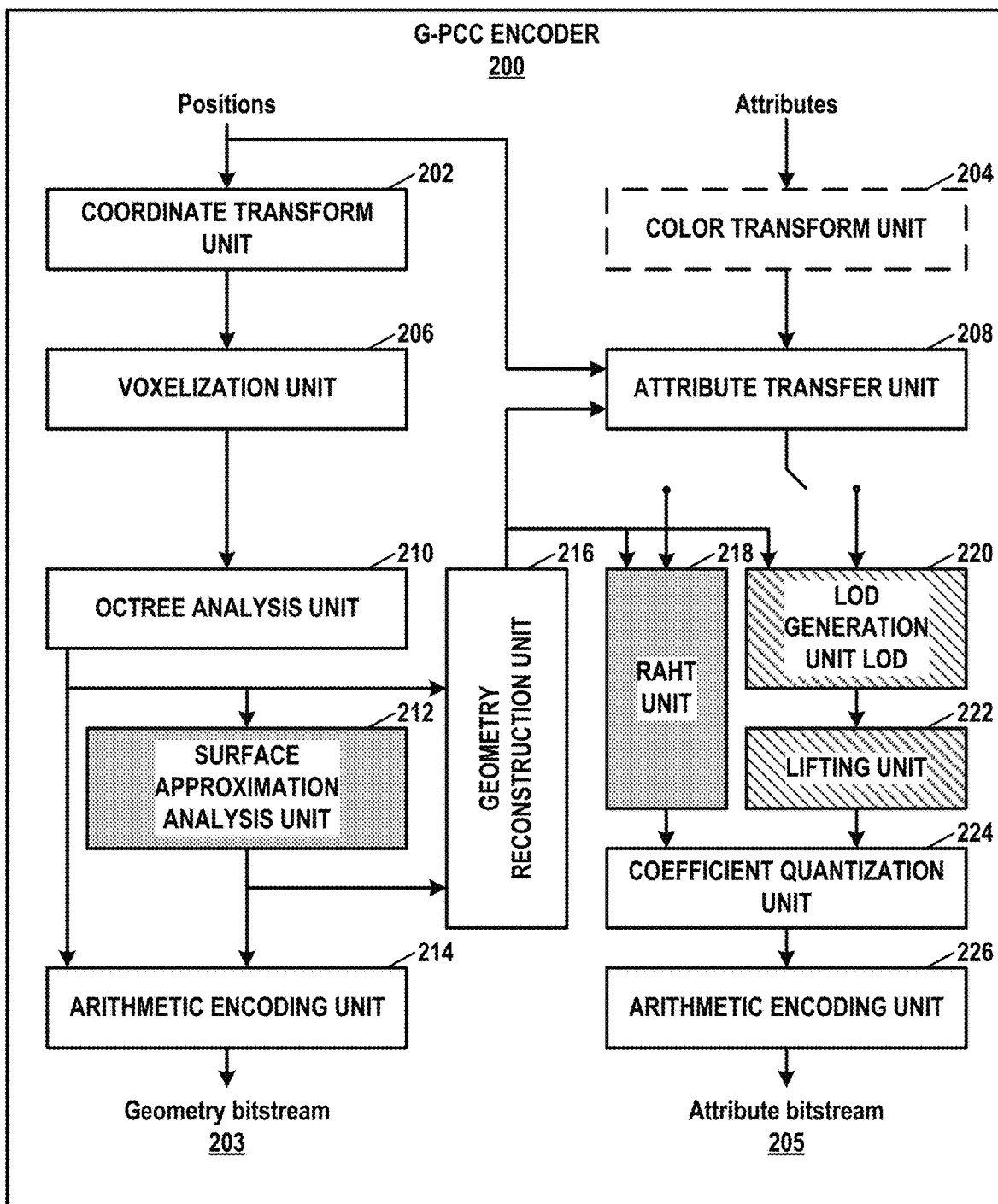
FIG. 2 is a block diagram illustrating an example Geometry Point Cloud Compression (G-PCC) encoder.
Figure 3:
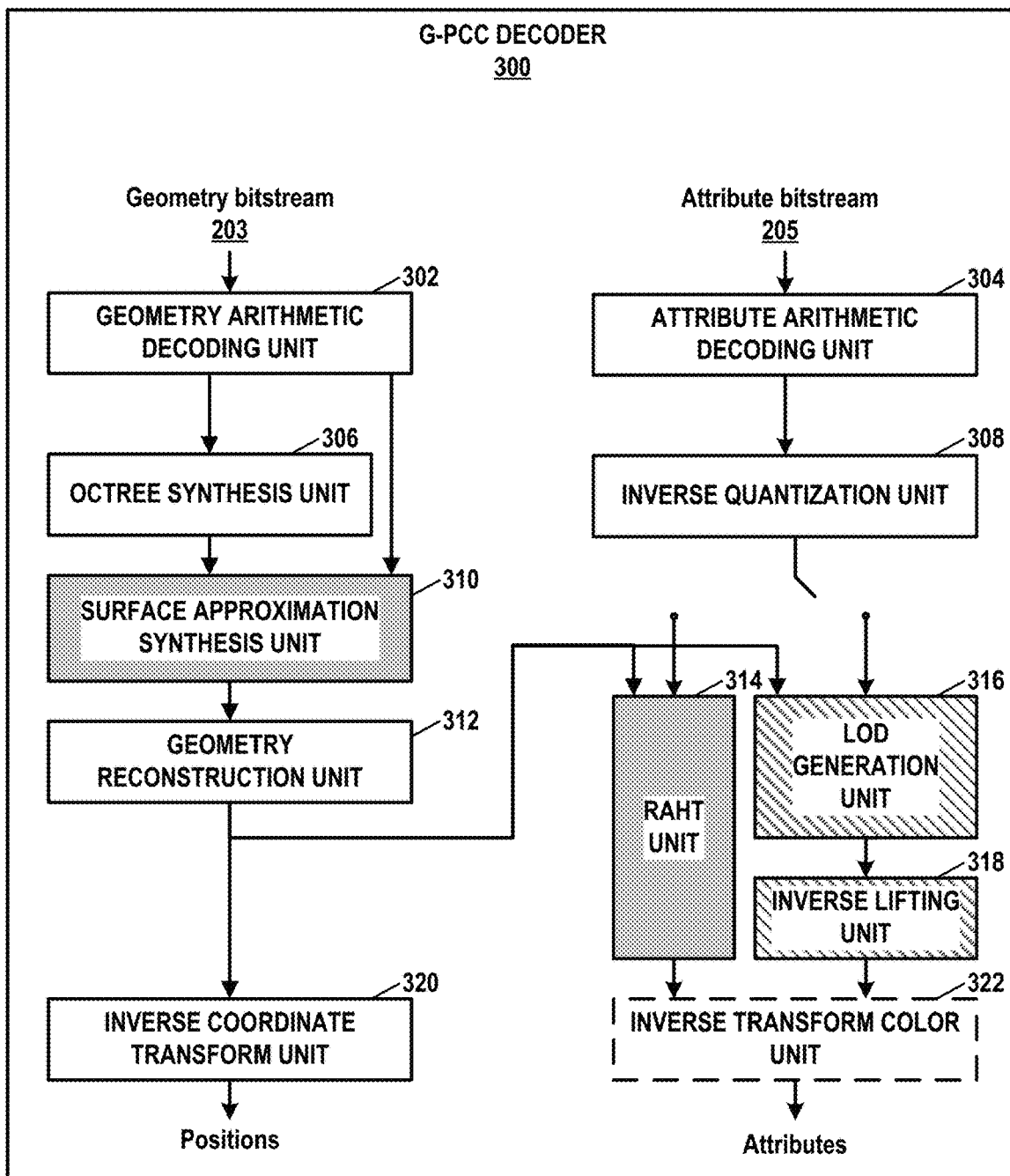
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec (e.g., as implemented by G-PCC encoder 200 and G-PCC decoder 300) also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, similar with the geometry codecs in G-PCC, the attribute coding method used to code the point cloud is specified in the bitstream.

The coding of the attributes may be conducted in a level-of-detail (LoD), where for each level of detail, a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding. To apply CABAC encoding to a syntax element, G-PCC encoder 200 may binarize the value of the syntax element to form a series of one or more bits, which are referred to as "bins." In addition, G-PCC encoder 200 may identify a coding context (i.e., a "context"). The coding context may identify probabilities of bins having particular values. For instance, a coding context may indicate a 0.7 probability of coding a 0-valued bin and a 0.3 probability of coding a 1-valued bin. After identifying the coding context, G-PCC encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, G-PCC encoder 200 may repeat these steps with the interval being the sub-interval associated with the value of the encoded bit. When G-PCC encoder 200 repeats these steps for the next bin, G-PCC encoder 200 may use modified probabilities based on the probabilities indicated by the identified coding context and the actual values of bins encoded.

When G-PCC decoder 300 performs CABAC decoding on a value of a syntax element, G-PCC decoder 300 may identify a coding context. G-PCC decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, G-PCC decoder 300 may decode a bin having the value associated with the lower sub-interval. If the encoded value is within the upper sub-interval, G-PCC decoder 300 may decode a bin having the value associated with the upper sub-interval. To decode a next bin of the syntax element, G-PCC decoder 300 may repeat these steps with the interval being the sub-interval that contains the encoded value. When G-PCC decoder 300 repeats these steps for the next bin, G-PCC decoder 300 may use modified probabilities based on the probabilities indicated by the identified coding context and the decoded bins. G-PCC decoder 300 may then de-binarize the bins to recover the value of the syntax element.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions of points of the point cloud and a set of attributes. G-PCC encoder 200 may obtain the set of positions of the points of the point cloud and the set of attributes from data source 104 (FIG. 1). The positions may include coordinates of points of a point cloud. The attributes may include information about the points of the point cloud, such as colors associated with points of the point cloud. G-PCC encoder 200 may generate a geometry bitstream 203 that includes an encoded representation of the positions of the points of the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform in order to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points of the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points of a point cloud. Inverse transform coordinate unit 320 may apply an inverse transform to the reconstructed coordinates to convert the reconstructed coordinates (positions) of the points of the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

G-PCC encoder 200 and G-PCC decoder 300 may support the angular coding mode. The angular coding mode was adopted at the 129th MPEG meeting in Brussels, Belgium. The following descriptions are based on the original MPEG contributions documents: Sebastien Lasserre, Jonathan Taquet, "[GPCC][CE 13.22 related] An improvement of the planar coding mode," ISO/IEC JTC1/SC29/WG11 MPEG/m50642, Geneva, CH, October 2019; and w19088.

The angular coding mode is optionally used together with planar mode (e.g., as described in Sebastien Lasserre, David Flynn, "[GPCC] Planar mode in octree-based geometry coding," ISO/IEC JTC1/SC29/WG11 MPEG/m48906, Gothenburg, Sweden, July 2019) and may improve the coding of the vertical (z) plane position syntax element by employing knowledge of positions and angles of sensing laser beams in a typical LIDAR sensor (see e.g., Sebastien Lasserre, Jonathan Taquet, "[GPCC] CE 13.22 report on angular mode," ISO/IEC JTC1/SC29/WG11 MPEG/m51594, Brussels, Belgium, January 2020).

Planar mode is a technique that may improve coding of which nodes are occupied. Planar mode may be used when all occupied child nodes of a node are adjacent to a plane and on a side of the plane associated with increasing coordinate values for a dimension orthogonal to the plane. For instance, planar mode may be used for a node when all occupied child nodes of the node are above or below a horizontal plane passing through a center point of the node, or planar mode may be used for a node when all occupied child nodes of the node are on a close side or a farther side of a vertical plane passing through the center point of the node. G-PCC encoder 200 may encode a plane position syntax element (i.e., a syntax element indicating a plane position) for each of an x, y, and z dimension. The plane position syntax element for a dimension indicates whether the plane orthogonal to the dimension is at a first position or a second position. If the plane is at the first position, the plane corresponds to a boundary of the node. If the plane is at the second position, the plane passes through a 3D center of the node. Thus, for the z-dimension, G-PCC encoder 200 or G-PCC decoder 300 may code a vertical plane position of a planar mode in a node of an octree that represents 3-dimensional positions of points of the point cloud.

Figure 4:
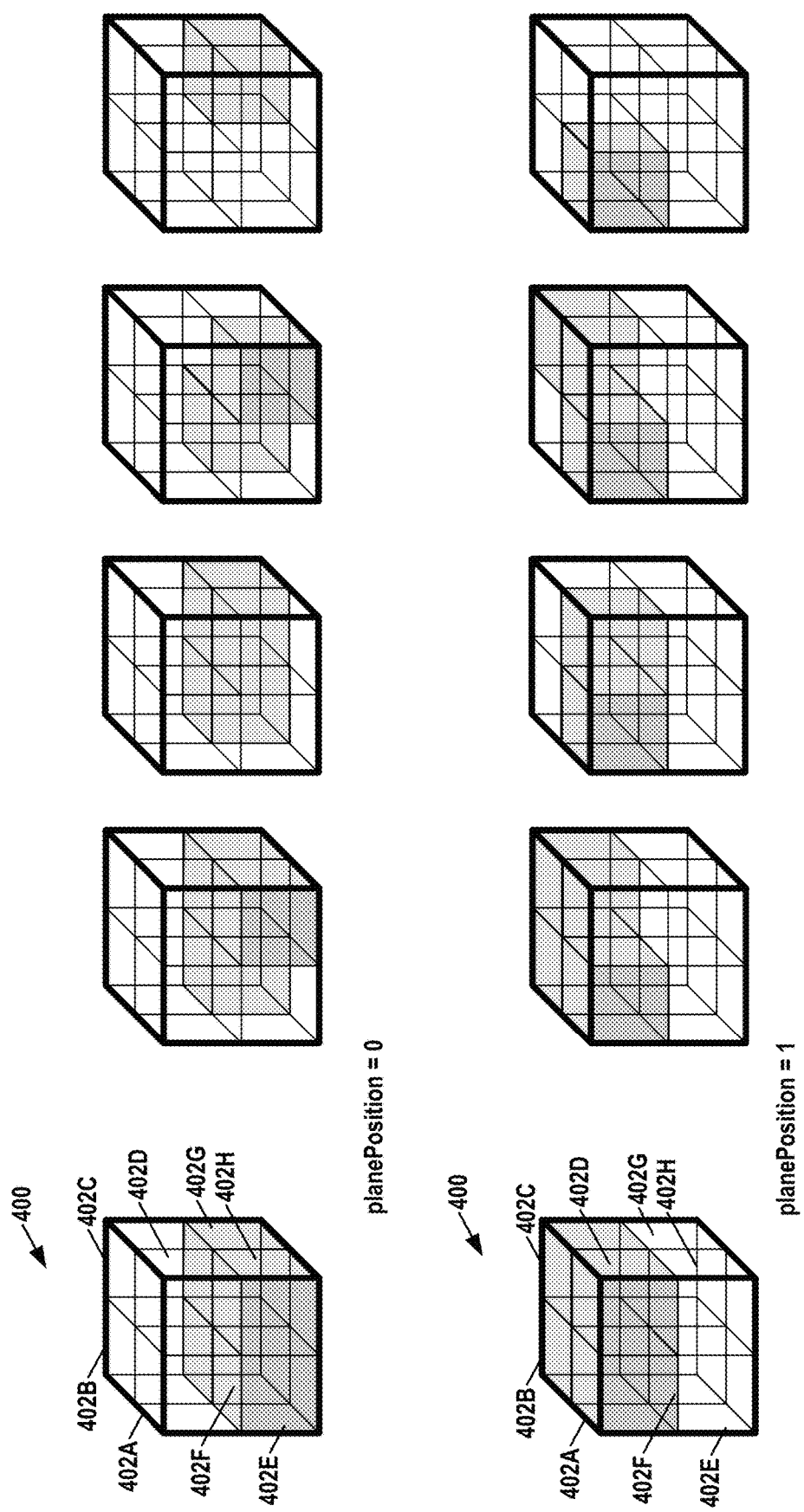
FIG. 4 is a conceptual diagram illustrating example planar occupancy in a vertical direction.

FIG. 4 is a conceptual diagram illustrating example planar occupancy in a vertical direction. In the example of FIG. 4, a node 400 is partitioned into eight child nodes 402A-402H (collectively, "child nodes 402"). Child nodes 402 may be occupied or unoccupied. In the example of FIG. 4, occupied child nodes are shaded. When one or more child nodes 402A-402D are occupied and none of child nodes 402E-402H are occupied, G-PCC encoder 200 may encode a plane position (planePosition) syntax element with a value of 0 to indicate that all occupied child nodes are adjacent on a positive side (i.e., a side of increasing z-coordinates) of a plane of the minimum z coordinate of node 400. When one or more child nodes 402E-402H are occupied and none of child nodes 402A-402D are occupied, G-PCC encoder 200 may encode a plane position (planePosition) syntax element with a value of 1 to indicate that all occupied child nodes are adjacent on a positive side of a plane of a midpoint z coordinate of node 400. In this way, the plane position syntax element may indicate a vertical plane position of a planar mode in node 400.

Figure 5:
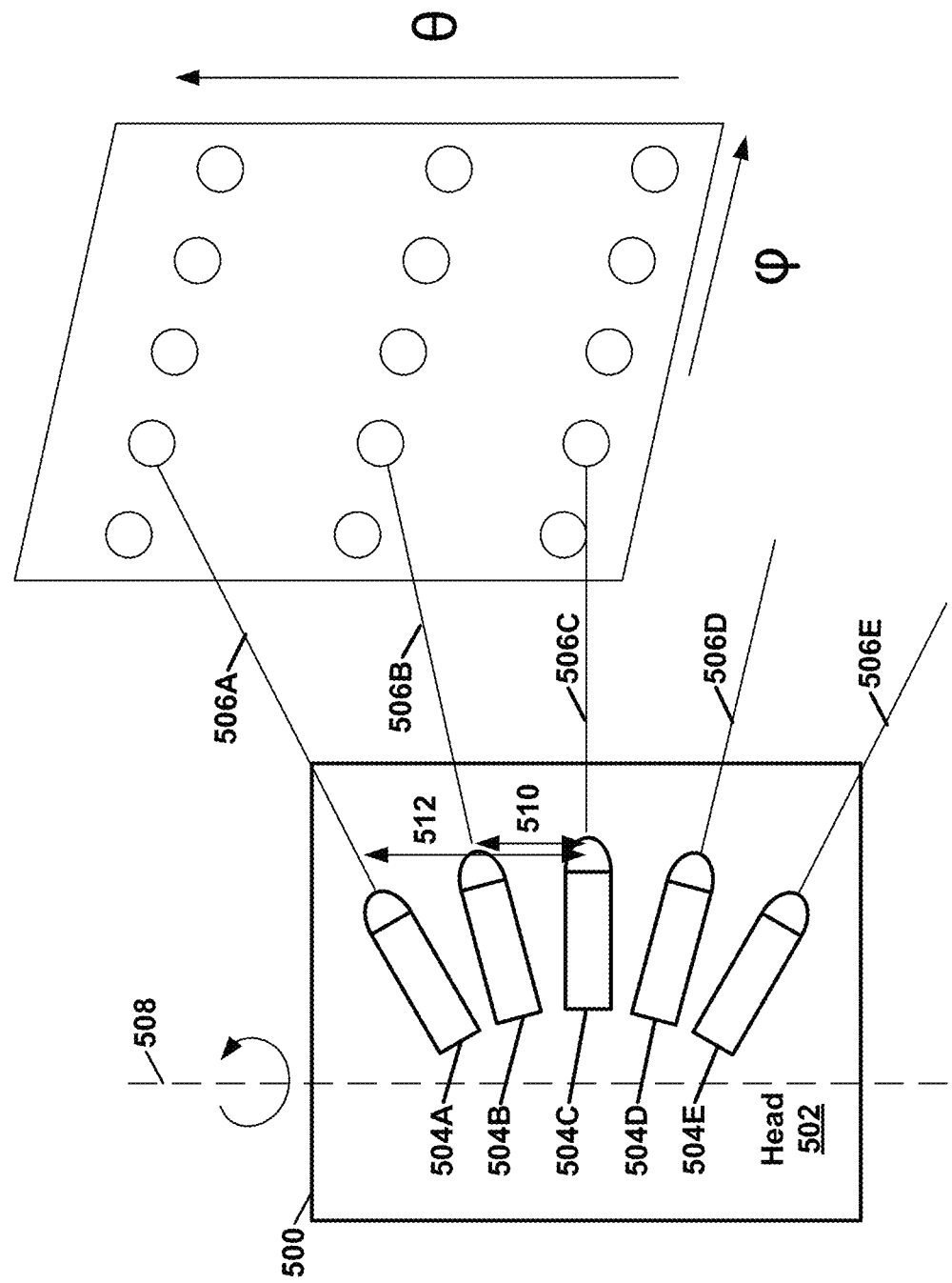
FIG. 5 is a conceptual diagram illustrating a light detection and ranging (LIDAR) sensor scanning points in 3-dimensional space.

FIG. 5 is a conceptual diagram illustrating a laser package 500, such as a LIDAR sensor or other system that includes one or more lasers, scanning points in 3-dimensional space. Data source 104 (FIG. 1) may include laser package 500. As shown in FIG. 5, point clouds can be captured using laser package 500, i.e., the sensor scans the points in 3D space. It is to be understood, however, that some point clouds are not generated by an actual LIDAR sensor but may be encoded as if they were. In the example of FIG. 5, laser package 500 includes a LIDAR head 502 that includes multiple lasers 504A-504E (collectively, "lasers 504") arrayed in a vertical plane at different angles relative to an origin point. Laser package 500 may rotate around a vertical axis 508. Laser package 500 may use returned laser light to determine the distances and positions of points of the point cloud. Laser beams 506A-506E (collectively, "laser beams 506") emitted by lasers 504 of laser package 500 may be characterized by a set of parameters. Distances denoted by arrows 510, 512 denotes an example laser correction values for laser 504B, 504A, respectively.

The angular coding mode may improve the coding of the vertical (z) plane position syntax element by employing knowledge of positions and elevation angles (represented using theta in FIG. 5) of sensing laser beams 506 in a typical LIDAR sensor (see e.g., Sebastien Lasserre, Jonathan Taquet, "[GPCC] CE 13.22 report on angular mode," ISO/IEC JTC1/SC29/WG11 MPEG/m51594, Brussels, Belgium, January 2020).

Furthermore, the angular coding mode can optionally be used to improve the coding of vertical z-position bits in Inferred Direct Coding Mode (IDCM) (Sebastien Lasserre, Jonathan Taquet, "[GPCC] CE 13.22 report on angular mode," ISO/IEC JTC1/SC29/WG11 MPEG/m51594, Brussels, Belgium, January 2020). IDCM is a mode in which the positions of points within a node are explicitly (directly) signaled relative to a point within a node. In the angular coding mode, the offsets of points may be signaled relative to an origin point of the node.

As shown in FIG. 5, while capturing points, each laser 504 of laser package 500 rotates around a z axis 508. The information about how many probes (scanning instant) each of lasers 504 performs in one full turn (360 degrees), i.e., the information about scanning in azimuth or phi direction, can be used to improve the x and y plane position of planar mode, and similarly for x- and y-position bits for IDCM (see e.g., Sébastien Lasserre, Jonathan Taquet, "[GPCC][CE 13.22 related] The new azimuthal coding mode," ISO/IEC JTC1/SC29/WG11 MPEG/m51596, Brussels, BE, January 2020).

The angular coding mode may be applied for nodes where the "angular size" (i.e., node_size/r) is small enough for the eligibility (where r indicates radial distance between the origin point of a node of an octree and a LIDAR head position, thus r is relative to LIDAR head position ($x_{Lidar}$, $y_{Lidar}$, $z_{Lidar}$)). In other words, the angular coding mode may be applied to a node if the angle is lower than the smallest angular delta between two lasers (i.e., $|tan(\theta_{L1})-tan(\theta_{L2})|$, where $\theta_{L1}$ indicates an angle of a laser L1 and $\theta_{L2}$ indicates an angle of a laser L2). Otherwise, for a larger node, there may be multiple lasers passing through the node. When there are multiple lasers passing through the node, angular mode may not be efficient.

Figure 6:
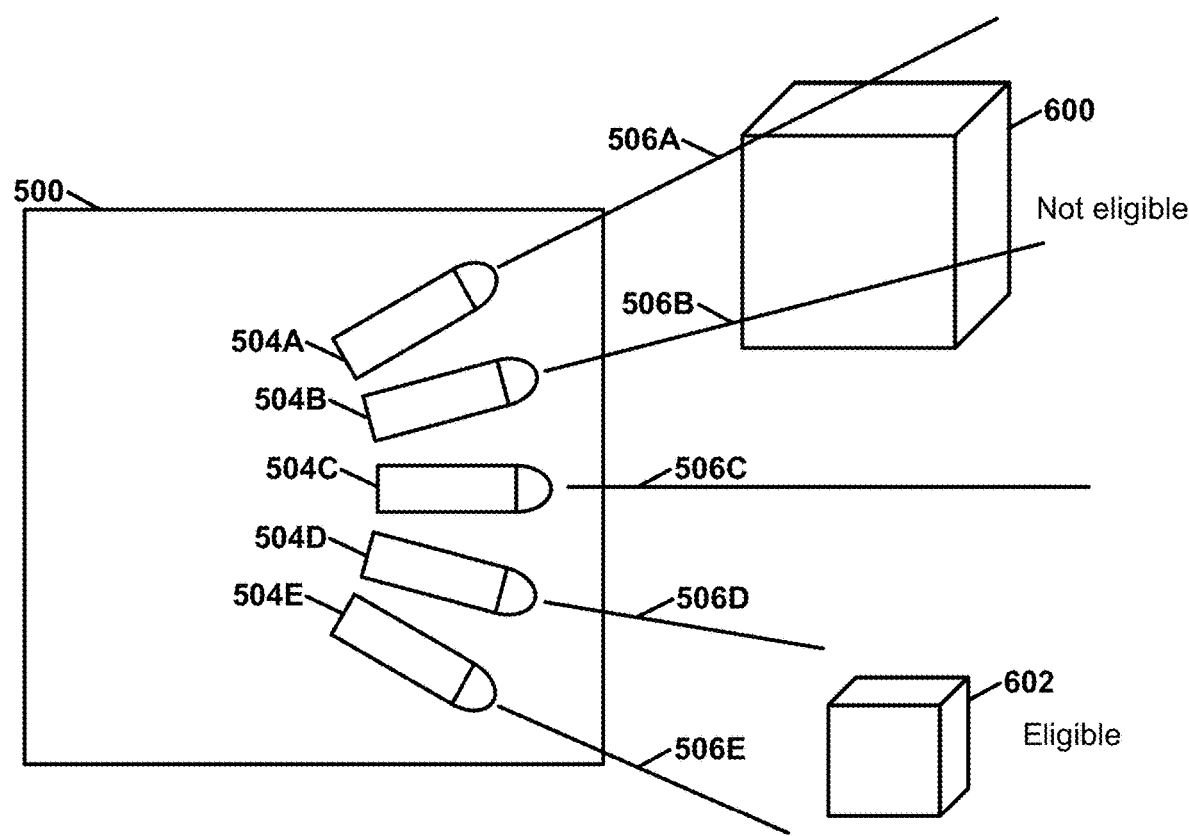
FIG. 6 is a conceptual diagram illustrating an example of angular eligibility of a node.

FIG. 6 is a conceptual diagram illustrating an example of angular eligibility of a node. In the example of FIG. 6, node 600 is determined to not be eligible because at least two of laser beams 506 intersect node 600. However, node 602 may be eligible for angular coding because node 602 is not intersected by two or more of laser beams 506.

As noted above, only some nodes in an octree may be eligible to be coded using the angular mode. The following describes a process for determining node eligibility for angular mode in w19088. The process applies to a child node Child to determine the angular eligibility angular_eligible [Child] of the child node. In w19088, a syntax element geometry_angular_mode_flag indicates whether the angular mode is active. If geometry_angular_mode_flag is equal to 0, angular_eligible[Child] is set to equal to 0. Otherwise, the following applies:

```
midNodeX = 1 << (ChildNodeSizeXLog2 - 1)
midNodeY = 1 << (ChildNodeSizeXLog2 - 1)
xLidar = abs( ((xNchild - lidar_head_position[0] +
  midNodeX) << 8 ) - 128 )
yLidar = abs( ((yNchild - lidar_head_position[1] +
  midNodeY) << 8 ) - 128 )
```

-continued

```
rL1 = (xLidar + yLidar) >> 1
deltaAngleR = deltaAngle*rL1
midNodeZ = 1 << (ChildNodeSizeZLog2 - 1)
if (deltaAngleR <= (midNodeZ << 26))
    angular_eligible[Child] = 0
else
    angular_eligible[Child] = 1
``` where deltaAngle is the minimum angular distance between the lasers determined by:

```
deltaAngle = min { | laser_angle [i] - laser_angle [j] | ; 0 ≤i < j <
number_lasers },
``` and where (xNchild, yNchild, zNchild) specifies the position of the geometry octree child node Child in the current slice.

The following process described in w19088 applies to a child node Child to determine the IDCM angular eligibility idcm4angular[Child] and the laser index laserIndex [Child] associated with the child node. If the angular eligibility angular_eligible[Child] is equal to 0, then idcm4angular [Child] is set to 0 and laserIndex [Child] index is set to a pre-set value UNKNOWN LASER. Otherwise, if the angular eligibility angular_eligible[Child] is equal to 1, the following applies as a continuation of the process described in section 8.2.5.1 of w19088. Firstly, the inverse rInv of the radial distance of the child node from the Lidar is determined as follows:

```
r2 = xLidar*xLidar + yLidar*yLidar
rInv = invSqrt (r2)
```

Then, an angle theta32 is determined for the child node:

```
zLidar = ((zNchild - lidar_head_position [2] + midNodeY) << 1) - 1
theta = zLidar*rInv
theta32 = theta >= 0 ? theta >> 15 : -((-theta) >> 15)
```

Finally, the angular eligibility and the laser associated with the child node are determined as shown in Table 3, below, based on the parent node Parent of the child node:

TABLE 3

```
laserIndex [Child] = UNKNOWN_LASER
idcm4angular[Child] = 0
if (laserIndex [Parent] == UNKNOWN_LASER || deltaAngleR <=
(midNodeZ<< (26 + 2)))
{
    minDelta = 1 << (18 + 7)
    for (j = 0; j < number_lasers; j++) {
        delta = abs(laser_angle [j] - theta32)
        if (delta < minDelta) {
            minDelta = delta
            laserIndex [Child] = j
        }
    }
} else idcm4angular[Child] = 1
```

The following describes coding of sensor laser beam parameters in w19088 for angular mode. The syntax elements that carry the LIDAR laser sensor information that may be required for the angular coding mode to have any coding efficiency benefits are indicated using <!> . . . </!> tags in Table 4, below. In Table 4, angular mode syntax elements are indicated with <!> . . . </!> tags in a geometry parameter set.

TABLE 4

Geometry parameter set syntax in w19088.

| | Descriptor |
|---|---|
| geometry_parameter_set( ) { | ... |
| ... | |
|     geometry_planar_mode_flag | u(1) |
|     if( geometry_planar_mode_flag ){ | |
|         geom_planar_mode_th_idcm | ue(v) |
|         geom_planar_mode_th[ 1 ] | ue(v) |
|         geom_planar_mode_th[ 2 ] | ue(v) |
|     } | |
| <!>    geometry_angular_mode_flag </!> | u(1) |
| <!>    if( geometry_angular_mode_flag ){</!> | |
| <!>        lidar_head_position[0]</!> | se(v) |
| <!>        lidar_head_position[1]</!> | se(v) |
| <!>        lidar_head_position[2]</!> | se(v) |
| <!>        number_lasers</!> | ue(v) |
| <!>        for( i = 0; i < number_lasers; i++ ) {</!> | |
| <!>            laser_angle[ i ]</!> | se(v) |
| <!>            laser_correction[ i ]</!> | se(v) |
| <!>        }</!> | |
| <!>        planar_buffer_disabled</!> | u(1) |
| <!>        implicit_qtbt_angular_max_node_min_dim_log2_to_split_z</!> | se(v) |
| <!>        implicit_qtbt_angular_max_diff_to_split_z</!> | se(v) |
| <!>    }</!> | |
|     neighbour_context_restriction_flag | u(1) |
|     inferred_direct_coding_mode_enabled_flag | u(1) |
| ... | |

The semantics of these syntax elements are specified as follows in w19088:
geometry_planar_mode_flag equal to 1 indicates that the planar coding mode is activated. geometry_planar_mode_flag equal to 0 indicates that the planar coding mode is not activated.
geom_planar_mode_th_idcm specifies the value of the threshold of activation for the direct coding mode. geom_planar_mode_th_idcm is an integer in the range 0 to 127 inclusive. When not present, geom_planar_mode_th_idcm is inferred to be 127.
geom_planar_mode_th[i], for i in the range 0 . . . 2, specifies the value of the threshold of activation for planar coding mode along the i-th most probable direction for the planar coding mode to be efficient. geom_planar_mode_th[i] is an integer in the range 0 . . . 127. geometry_angular_mode_flag equal to 1 indicates that the angular coding mode is activated. geometry_angular_mode_flag equal to 0 indicates that the angular coding mode is not activated.
lidar_head_position[ia], for ia in the range 0 . . . 2, specifies the ia-th coordinate of the lidar head in the coordinate system associated with the internal axes. When not present, lidar_head_position[ia] is inferred to 0.
number_lasers specifies the number of lasers used for the angular coding mode. When not present, number_lasers is inferred to 0.
laser_angle[i], for i in the range 1 . . . number_lasers, specifies the tangent of the elevation angle of the i-th laser relative to the horizontal plane defined by the 0-th and the 1-th internal axes.
laser_correction [i], for i in the range 1 . . . number_lasers, specifies the correction, along the 2-th internal axis, of the i-th laser position relative to the lidar head position lidar_head_position[2]. When not present, laser_correction [i] is inferred to 0.
planar_buffer_disabled equal to 1 indicates that tracking the closest nodes using a buffer is not used in a process of coding the planar mode flag and the plane position in the planar mode. planar_buffer_disabled equal to 0 indicates that tracking the closest nodes using a buffer is used. When not present, planar_buffer_disabled is inferred to 0.
implicit_qtbt_angular_max_node_min_dim_log 2_to_split_z specifies the log 2 value of a node size below which horizontal split of nodes is preferred over vertical split. When not present, implicit_qtbt_angular_max_diff_to_split_z is inferred to 0.
implicit_qtbt_angular_max_diff_to_split_z specifies the log 2 value of the maximum vertical over horizontal node size ratio allowed to a node. When not present, implicit_qtbt_angular_max_node_min_dim_log 2_to_split_z is inferred to 0.

The syntax and semantics of the syntax elements in the geometry parameter set were updated in G-PCC DIS, ISO/IEC JTC1/SC29/WG11 w19328, Alpbach, Austria, June 2020 (hereinafter, "w19328_d2"). The syntax elements that carry the LIDAR laser sensor information that are required for the angular and azimuthal coding modes to have coding efficiency benefits are indicated with <!> . . . </!> tags in Table 2, below.

TABLE 2

Geometry parameter set syntax in w19329.

| | Descriptor |
|---|---|
| geometry_parameter_set( ) { | |
|     gps_geom_parameter_set_id | ue(v) |
|     gps_seq_parameter_set_id | ue(v) |
|     gps_gsh_box_log2_scale_present_flag | u(1) |
|     if( !gps_gsh_box_log2_scale_present_flag) | |
|         gps_gs_box_log2_scale | ue(v) |
|     unique_geometry_points_flag | u(1) |
|     geometry_planar_mode_flag | u(1) |
|     if( geometry_planar_mode_flag ){ | |

TABLE 2-continued

Geometry parameter set syntax in w19329.

| | | | Descriptor |
|---|---|---|---|
| | | geom_planar_mode_th_idcm | ue(v) |
| | | geom_planar_mode_th[ 0 ] | ue(v) |
| | | geom_planar_mode_th[ 1 ] | ue(v) |
| | | geom_planar_mode_th[ 2 ] | ue(v) |
| | | geometry_angular_mode_flag | u(1) |
| | } | | |
| | if( geometry_angular_mode_flag ){ | | |
| | | for( k = 0; k < 3; k++ ) | |
| | | geom_angular_origin_xyz[ k ] | se(v) |
| <!> | number_lasers_minus1 | | ue(v) </!> |
| <!> | laser_angle[ 0 ] | | se(v) </!> |
| <!> | laser_correction[ 0 ] | | se(v) </!> |
| <!> | laser_numphi_perturn[0] | | ue(v) </!> |
| <!> | for( i = 1; i <= number_lasers_minus1; i++ ) { | | </!> |
| <!> | laser_angle_diff[ i ] | | ue(v) </!> |
| <!> | laser_correction_diff[ i ] | | se(v) </!> |
| <!> | laser_numphi_perturn[ i ] | | ue(v) </!> |
| <!> | } </!> | | |
| | | planar_buffer_disabled_flag | u(1) |
| | } | | |
| | neighbour_context_restriction_flag | | u(1) |
| | inferred_direct_coding_mode_enabled_flag | | u(1) |
| | bitwise_occupancy_coding_flag | | u(1) |
| | adjacent_child_contextualization_enabled_flag | | u(1) |
| | log2_neighbour_avail_boundary | | ue(v) |
| | log2_intra_pred_max_node_size | | ue(v) |
| | log2_trisoup_node_size | | ue(v) |
| | geom_scaling_enabled_flag | | u(1) |
| | if( geom_scaling_enabled_flag ) | | |
| | | geom_base_qp_minus4 | ue(v) |
| | geom_tree_coded_axis_list_present_flag | | u(1) |
| | gps_extension_flag | | u(1) |
| | if( gps_extension_flag) | | |
| | | while( more_data_in_byte_stream( ) ) | |
| | | | gps_extension_data_flag | u(1) |
| | byte_alignment( ) | | |
| } | | | |

The semantics of these syntax elements are specified as follows in w19328_d2:

number_lasers_minus1 plus 1 specifies the number of lasers used for the angular coding mode. When not present, number_lasers_minus1 is inferred to be 0.

laser_angle[i] and laser_angle_diff[i], for i in the range 0 . . . number_lasers_minus1, specify the tangent of the elevation angle of the i-th laser relative to the horizontal plane defined by the first and second coded axes. When not present, laser_angle[i] is inferred to be 0.

laser_correction[i] and laser_correction_diff[i], for i in the range 0 . . . number_lasers_minus1, specifies the correction, along the second internal axis, of the i-th laser position relative to the geomAngularOrigin[2]. When not present, laser_correction[i] is inferred to be 0.

The arrays LaserAngle and LaserCorrection, with elements laserAngle[i] and LaserCorrection[i], for i in the range of 0 . . . number_lasers_minus1, are derived as follows:

```
LaserAngle[0] = laser_angle[0]
LaserCorrection[0] = laser_correction[0]
for (i = 1; i <= number_lasers_minus1; i++) {
    LaserAngle[i] = LaserAngle[i - 1] + laser_angle_diff[i]
    LaserCorrection[i] = LaserCorrection[i - 1] + laser_correction_diff[i]
}
``` laser_numphi_perturn[i] for i in the range 0 . . . number_lasers_minus1, specify the number of probes in the azimuth direction for one full rotation of the i-th laser. When not present, laser_numphi_perturn[i] is inferred to be 0.

As described in the previous section, laser angles are predicted and the predicted value is actually the laser angle of the previous laser, i.e., for laser angle[i] the predicted value is laser_angle[i−1] (except for i=0, where the predicted value is equal to zero). Subsequently, the difference, i.e., laser_angle_diff[i](=laser_angle[i]−predicted value) is coded. However, this "copy" prediction (copying the immediate previous coded value for prediction) is not optimal. The techniques of this disclosure may demonstrate an improvement for the predicted value of laser_angle[i], such that the coding efficiency of syntax laser_angle_diff[i] is further improved.

In w19088, for every laser, the corresponding laser angle, and laser offset (laser position relative to the head position) is coded (e.g., as indicated with text enclosed in <!> . . . </!> tags), as indicated in Table 5 below.

TABLE 5

| | | Descriptor |
|---|---|---|
| geometry_parameter_set( ) { | | |
| ... | | |
| | geometry_planar_mode_flag | u(1) |
| | if( geometry_planar_mode_flag ){ | |
| | | geom_planar_mode_th_idcm | ue(v) |
| | | geom_planar_mode_th[ 1 ] | ue(v) |
| | | geom_planar_mode_th[ 2 ] | ue(v) |
| | } | |
| | geometry_angular_mode_flag | u(1) |
| | if( geometry_angular_mode_flag ){ | |
| | | lidar_head_position[0] | se(v) |
| | | lidar_head_position[1] | se(v) |
| | | lidar_head_position[2] | se(v) |
| | | number_lasers | ue(v) |
| <!> | for( i = 0; i < number_lasers; i++ ) {</!> | |
| <!> | laser_angle[ i ]</!> | se(v) |
| <!> | laser_correction[ i ]</!> | se(v) |
| <!> | }</!> | |
| | planar_buffer_disabled | u(1) |
| | implicit_qtbt_angular_max_node_min_dim_log2_to_split_z | se(v) |

TABLE 5-continued

|  | Descriptor |
|---|---|
| implicit_qtbt_angular_max_diff_to_split_z | se(v) |
| } | |
| neighbour_context_restriction_flag | u(1) |
| inferred_direct_coding_mode_enabled_flag | u(1) |
| ... | |

Thus, in some examples, G-PCC encoder 200 may code, for each laser of the set of laser candidates, a corresponding laser angle and a corresponding laser offset (i.e., laser correction).

The laser angles may be arranged in a sorted format, e.g., the angles are monotonically increasing or decreasing with the array index. If not arranged in this format, a preprocessing of the input can be possible to sort the angles prior to coding. It is observed that the laser angles are very similar to each other. In this scenario, the angles of array index i can be predicted from angle of index i−1, and only the difference can be encoded, i.e., delta coding can be applied.

It is observed that the angle of a particular laser is very similar to its neighbor laser(s). In this scenario, the angle of the i-th laser can be predicted from an angle of the (i−1)-th laser, and only the difference can be encoded, i.e., delta coding can be applied with se(v) coding.

The similar delta coding can also be applied for the laser correction, as shown in Table 6, below.

The laser angle[i] and laser_correction[i] can be derived respectively from laser_angle_delta[i] and laser_correction_delta[i], at G-PCC decoder 300, as follows:

```
pred_angle = 0 ;
pred_correction = 0 ;
For(i=0;i<number_lasers;i++){
    If (i>0){
        pred_angle = laser_angle[i −1];
        pred_correction = laser_correction[i −1];
    }
    laser_angle[i] = laser_angle_delta[i] + pred_angle ;
    laser_correction[i] = laser_correction_delta[i] + pred_correction ;
}
```

In some examples, laser_angle_delta[i] (except for laser_angle_delta[0]) can be coded as an unsigned integer if

TABLE 6

|  | Descriptor |
|---|---|
| geometry_parameter_set( ) { | |
| ... | ... |
| geometry_planar_mode_flag | u(1) |
| if( geometry_planar_mode_flag ){ | |
| geom_planar_mode_th_idcm | ue(v) |
| geom_planar_mode_th[ 1 ] | ue(v) |
| geom_planar_mode_th[ 2 ] | ue(v) |
| } | |
| geometry_angular_mode_flag | u(1) |
| if( geometry_angular_mode_flag ){ | |
| lidar_head_position[0] | se(v) |
| lidar_head_position[1] | se(v) |
| lidar_head_position[2] | se(v) |
| number_lasers | ue(v) |
| <!>      for( i = 0; i < number_lasers; i++) {<!> | |
| <!>            laser_angle_delta[ i ]<!> | se(v) |
| <!>            laser_correction_delta[ i ]<!> | se(v) |
| <!> }       </!> | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| ... | | the laser angles are sorted (monotonically increasing and decreasing), as the deltas would be either all positive or all negative.

So, for laser_angle_delta [0], se(v) coding (i.e., signed integer 0-th order Exp-Golomb coding with left bit first (i.e., most significant bit first)) is used, and for other laser_angle_delta[i](i>0), ue(v) coding is used. laser_offset_deltas are coded with se(v), e.g., as shown in Table 7 below.

TABLE 7

|  | Descriptor |
|---|---|
| geometry_parameter_set( ) { | ... |
| ... |  |
| geometry_planar_mode_flag | u(1) |
| if( geometry_planar_mode_flag ){ |  |
| geom_planar_mode_th_idcm | ue(v) |
| geom_planar_mode_th[ 1 ] | ue(v) |
| geom_planar_mode_th[ 2 ] | ue(v) |
| } |  |
| geometry_angular_mode_flag | u(1) |
| if( geometry_angular_mode_flag ){ |  |
| lidar_head_position[0] | se(v) |
| lidar_head_position[1] | se(v) |
| lidar_head_position[2] | se(v) |
| number_lasers | ue(v) |
| <!>for(i=0; i <number_lasers; i++ ) {</!> |  |
| <!>        if(i==0)</!> |  |
| <!>            laser_angle_delta[ i ]</!> | se(v) |
| <!>        else</!> |  |
| <!>            laser_angle_delta[ i ]</!> | ue(v) |
| <!>            laser_correction_delta[ i ]</!> | se(v) |
| <!>}</!> |  |
| planar_buffer_disabled | u(1) |
| implicit_qtbt_angular_max_node_min_dim_log2_to_split_z | se(v) |
| implicit_qtbt_angular_max_diff_to_split_z | se(v) |
| } |  |
| neighbour_context_restriction_flag | u(1) |
| infer_reddirect_coding_mode_enabled_flag | u(1) |
| ... |  |

In another example, laser_angle_delta[i] and laser_correction_delta[i] can be coded with Exp-Golomb code with order k. k can be self-adaptive (based on the magnitude of delta values), fixed and encoder configurable, or fixed and predetermined. In another example, delta coding may only be applicable to laser angles but not laser corrections.

The techniques of this disclosure may demonstrate an improvement for the predicted value of laser_angle[i], such that the coding efficiency of syntax laser_angle_diff[i] is further improved. The sorted laser angles (in a LIDAR capturing scenario), which are to be coded, are roughly linearly increasing. For example, the laser angles for 'Ford1' sequence are shown below in Table 8.

TABLE 8

A partial list of sorted Laser angles of Ford1 sequence and the resulting deltas needed to be coded

| angle: −78213 | delta_old: 2560 | delta: 11 |
| angle: −75777 | delta_old: 2436 | delta: −124 |
| angle: −73175 | delta_old: 2602 | delta: 166 |
| angle: −70688 | delta_old: 2487 | delta: −115 |
| angle: −68170 | delta_old: 2518 | delta: 31 |
| angle: −65699 | delta_old: 2471 | delta: −47 |
| angle: −63217 | delta_old: 2482 | delta: 11 |
| angle: −60747 | delta_old: 2470 | delta: −12 |
| angle: −58291 | delta_old: 2456 | delta: −14 |
| angle: −55847 | delta_old: 2444 | delta: −12 |
| angle: −53399 | delta_old: 2448 | delta: 4 |
| angle: −50965 | delta_old: 2434 | delta: −14 |

TABLE 8-continued

A partial list of sorted Laser angles of Ford1 sequence and the resulting deltas needed to be coded

| angle: −48537 | delta_old: 2428 | delta: −6 |
| angle: −46113 | delta_old: 2424 | delta: −4 |
| angle: −43696 | delta_old: 2417 | delta: −7 |

TABLE 8-continued

A partial list of sorted Laser angles of Ford1 sequence and the resulting deltas needed to be coded

| angle: −41283 | delta_old: 2413 | delta: −4 |
| angle: −39276 | delta_old: 2007 | delta: −406 |
| angle: −37682 | delta_old: 1594 | delta: −413 |
| angle: −36090 | delta_old: 1592 | delta: −2 |
| angle: −34506 | delta_old: 1584 | delta: −8 |
| angle: −32921 | delta_old: 1585 | delta: 1 |
| angle: −31341 | delta_old: 1580 | delta: −5 |
| angle: −29763 | delta_old: 1578 | delta: −2 |
| angle: −28189 | delta_old: 1574 | delta: −4 |
| angle: −26615 | delta_old: 1574 | delta: 0 |

As a result, it can be observed that the deltas resulting from using the "copy" predictor (i.e., for i-th angle the prediction value is (i−1)th angle), referred to as delta_old, are correlated with each other.

As the angles are linearly increasing, in one example, performing linear prediction using the last two samples may yield a simple but effective prediction, referred to as delta in Table 8. It is clear that the magnitudes of delta values are smaller compared to delta_old values.

Accordingly, the changes in the semantics are indicated with <!> . . . </!> tags:

```
LaserAngle[0] = laser_angle[0]
LaserCorrection[0] = laser_correction[0]
for (i = 1; i <= number_lasers_minus1; i++) {
    LaserAngle[i] = <!>(i==1)? LaserAngle[i − 1] :
(2*LaserAngle[i−1] − LaserAngle[i−2])</!> +
laser_angle_diff[i]
    LaserCorrection[i] = LaserCorrection[i − 1] +
laser_correction_diff[i]
}
```

Thus, when determining the predicted value, a G-PCC coder may determine the predicted value as 2*the first laser angle plus −1*the second laser angle (i.e., 2*LaserAngle[i−1]−LaserAngle[i−2]]).

Because the proposed linear prediction requires the last two coded angles to exist, the proposed linear prediction is invoked for i>=2. So, the prediction process is not changed for i=0 (predicted value=0) and i=1 ("copy" predictor). Furthermore, when linear prediction is invoked, the corresponding predicted value may exceed the actual laser angle (unlike "copy" prediction with laser angles sorted in an increasing order), so the laser_angle_diff[ ] may be negative, positive or zero, such that the laser_angle_diff[ ] are needed to be coded with se(v). se(v) indicates a signed integer 0-th order Exp-Golomb-coded syntax element with left bit first. The modified syntax change is shown below in Table 9 with <!> . . . </!> tags:

TABLE 9

| | |
|---|---|
| number_lasers_minus1 | ue(v) |
| laser_angle[ 0 ] | se(v) |
| laser_correction[ 0 ] | se(v) |
|     laser_numphi_perturn[0] | ue(v) |
| for( i = 1; i <= number_lasers_minus1; i++ ) { | |
|     laser_angle_diff[ i ] | <!>se(v)</!> |
|     laser_correction_diff[ i ] | se(v) |
|         laser_numphi_perturn[ i ] | ue(v) |
| } | |

Thus, in some examples, G-PCC encoder 200 may determine a first laser angle (e.g., similar to LaserAngle[0] in the semantics above); determine a second laser angle (e.g., similar to LaserAngle[i] for (i==1) in the semantics above); determine a predicted value based on the first laser angle and the second laser angle (e.g., similar to 2*LaserAngle[i−1]−LaserAngle[i−2] in the semantics above); and determine a laser angle difference for a third laser angle (e.g., similar to laser_angle_diff[i] in the semantics above). Further, G-PCC encoder 200 may encode a syntax element for the first laser angle (e.g., laser_angle[0] in Table 9), and encode a syntax element for the laser angle difference for a third laser angle (e.g., laser_angle_diff[i] for (i−1), in Table 9). The syntax element for the laser angle difference indicates a laser angle difference for the third laser angle such that the third laser angle can be determined at G-PCC decoder 300 based on the first laser angle, the second laser angle, and the laser angle difference for the third laser angle. G-PCC encoder 200 may encode a point of the point cloud, in some examples its vertical position, based on the third laser angle.

Similarly, G-PCC decoder 300 may determine a first laser angle (e.g., LaserAngle[0] in the semantics above); determine a second laser angle (e.g., LaserAngle[i] for (i==1) in the semantics above); determine a laser angle difference for a third laser angle (e.g., laser_angle_diff[i] in the semantics above), preferably by decoding a syntax element specifying the laser angle difference for the third laser angle; predict a third laser angle based on the first laser angle, the second laser angle (e.g., 2*LaserAngle[i−1]−LaserAngle[i−2] in the semantics above), and determine the third laser angle based on the prediction for the third laser angle and the laser angle difference for the third laser angle (e.g., (2*LaserAngle[i−1]−LaserAngle[i−2])+laser_angle_diff[i] in the semantics above). Further, G-PCC decoder 300 may decode a point of the point cloud, in some examples its vertical position, based on the third laser angle.

Related to the previous example, alternatively, laser angle diff for (i==1) can be coded with ue(v) because laser angle delta still employs "copy" prediction, while the other angle deltas are coded with se(v). Changes are shown in Table 10 with <!> . . . </!> tags.

TABLE 10

| | |
|---|---|
| number_lasers_minus1 | ue(v) |
| laser_angle[ 0 ] | se(v) |
| laser_correction[ 0 ] | se(v) |
|     laser_numphi_perturn[0] | ue(v) |
| for( i = 1; i <= number_lasers_minus1; i++ ) { | |
| <!>    if(i==1)</!> | |
| <!>    laser_angle_diff[ i ] </!> | </!>ue(v) </!> |
| <!>    else</!> | |
| <!>    laser_angle_diff[ i ]</!> | </!>se(v) </!> |
|     laser_correction_diff[ i ] | se(v) |
|         laser_numphi_perturn[ i ] | ue(v) |
| } | |

In another example, a more generic weighted prediction, using last p coded angles, can be employed to generate the prediction value for the laser angle. The coefficients for weighted prediction and the value of p can be either fixed, pre-determined, or coded.

Some examples, a syntax element (laser_info_pred_idc) is coded that specifies the model used to derive the laser angles and laser correction from the syntax elements. For example, a first value of the syntax element may specify that the predicted value for the i-th laser is the value (or derived from the value) of the (i−1)-th laser; a second value of the syntax element may specify that the predicted value of the i-th laser is derived from the (i−1)-th and (i−2)-th laser; and a third value may be specify that the predicted value for the i-th laser is a fixed value such as 0. More generally, different values of the syntax element may be used to specify different methods to derive a predicted value. The value of the syntax element may be coded once for all the lasers (for some laser indices, one or more default values may be chosen irrespective of the value of this syntax element), or may be coded for each laser (i.e., each index i). For some lasers, the syntax element may not be coded, and a default value may be specified (e.g., for the first laser, the predicted value may be derived to be 0). The following syntax table shows how laser_info_pred_idc is coded for each laser. Changes are shown in Table 11 with <!> . . . </!> tags.

TABLE 11

| | |
|---|---|
| for( i = 1; i <= number_lasers_minus1; i++ ) { | |
| <!>    laser_info_pred_idc[ i ]</!> | <!>u(1)</!> |
|     laser_angle_diff[ i ] | se(v) |
|     laser_correction_diff[ i ] | se(v) |
|     laser_numphi_perturn[ i ] | ue(v) |
| } | |

In some examples, the value laser_info_pred_idc[i] is coded as ue(v).

laser_info_pred_idc[i] specifies the method to derive the laser information from the syntax elements laser_angle_diff [i] and laser_correction_diff[i]. laser_info_pred_idc[i] equal to 0 specifies that that (i−1)-th laser information is used to derive the information for the i-th laser. laser_info_pred_idc [i] equal to 1 specifies that that (i−1)-th and (i−2)-th laser information are used to derive the information for the i-th laser. laser_info_pred_idc[i] equal to 2 specifies that no prediction information is used to derive the information for the i-th laser. The value of laser_info_pred_idc[0] is inferred to be 2 and the value of laser_info_pred_idc[1] is inferred to be equal to 0.

The laser information is derived as follows:

```
LaserAngle[0] = laser_angle[0]
LaserCorrection[0] = laser_correction[0]
for (i = 1; i <= number_lasers_minus1; i++) {
    LaserAngle[i] = <!>(laser_info_pred_idc[i] == 0)?
LaserAngle[i − 1]: (laser_info_pred_idc[i] == 1)?
(2*LaserAngle[i−1] − LaserAngle[i−2]): 0</!> +
laser_angle_diff[i]
    LaserCorrection[i] = LaserCorrection[i − 1] +
laser_correction_diff[i]
}
```

In some examples, the presence of laser_info_pred_idc (or laser_info_pred_flag) may be conditioned by a presence flag. When the laser_info_pred_idc is not present, one or more default values may be chosen to specify the models for laser information prediction. Thus, G-PCC encoder 200 may encode a laser information prediction indicator syntax element that specifies a method to derive laser information from the laser angle difference syntax element for the third laser angle. Similarly, in some examples, G-PCC decoder 300 may decode a laser information prediction indicator syntax element (e.g., laser_info_pred_idc) that specifies a method to derive laser information from the laser angle difference syntax element for a laser angle.

Figure 7A:
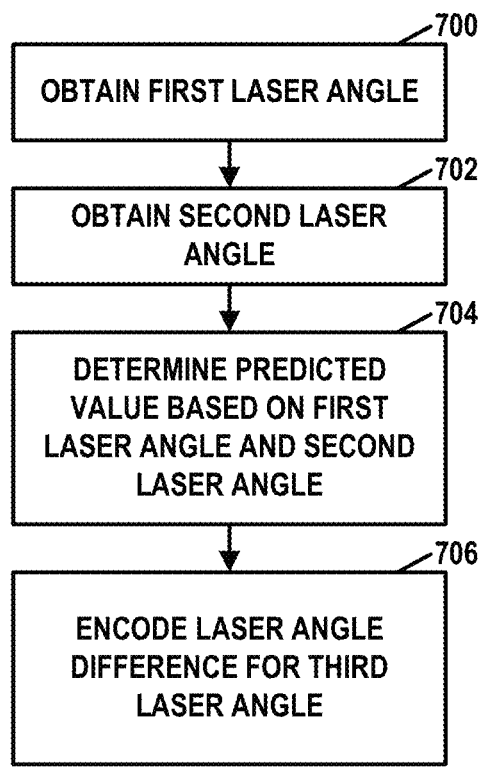
FIG. 7A is a flowchart illustrating an example operation of a G-PCC encoder in accordance with one or more techniques of this disclosure.

FIG. 7A is a flowchart illustrating an example operation of G-PCC encoder 200 in accordance with one or more techniques of this disclosure. In the example of FIG. 7A, G-PCC encoder 200 may obtain (e.g., determine) a first laser angle (700). The first laser angle may indicate a tangent of an elevation angle of a first laser beam relative to a horizontal plane defined by a first (e.g., x) internal axis and a second axis (e.g., y) of the point cloud data. Additionally, G-PCC encoder 200 may obtain a second laser angle (702). The second laser angle may indicate a tangent of an elevation angle of a second laser beam relative to the horizontal plane defined by the first axis and the second axis of the point cloud data. G-PCC encoder 200 may obtain the first and second laser angles based on configuration information regarding a LIDAR system (or other system) provided to G-PCC encoder 200.

G-PCC encoder 200 may determine a predicted value based on the first laser angle and the second laser angle (704). For instance, G-PCC encoder 200 may determine the predicted value by performing a linear prediction based on the first laser angle and the second laser angle. In other examples, G-PCC encoder 200 may determine the predicted value by applying weighted prediction using the first laser angle and the second laser angle.

In the example of FIG. 7A, G-PCC encoder 200 may encode a laser angle difference (e.g., a laser_angle_diff syntax element) for a third laser angle (706). The laser angle difference is equal to a difference between the third laser angle and the predicted value. The third laser angle may specify a tangent of an elevation angle of a third laser relative to the horizontal plane.

In some examples, G-PCC encoder 200 may encode syntax elements for one or more of the first laser angle, the second laser angle, and the laser angle difference for the third laser angle. For instance, G-PCC encoder 200 may encode a syntax element specifying the laser angle difference for the third laser angle as a signed integer 0-th order Exp-Golomb-coded syntax element with left bit first. In some examples, G-PCC encoder 200 may encode a laser angle difference syntax element (e.g., laser_angle_diff) for the second laser angle. In this example, the laser angle difference syntax element for the second laser angle indicates a difference between the second laser angle and the first laser angle, and the laser angle difference syntax element for the second laser angle may be encoded as a signed integer 0-th order Exp-Golomb-coded syntax element with left bit first.

Furthermore, in some examples, G-PCC encoder 200 may encode a point of the point cloud data based on one of the first laser angle, the second laser angle, and the third laser angle. For instance, G-PCC encoder 200 may encode a vertical position of a point of the point cloud based on the third laser angle. For example, G-PCC encoder 200 may determine a context associated with a location at which a third laser (i.e., a laser having the third laser angle) intersects a current node containing the point. For instance, G-PCC encoder 200 may determine, based on the third laser angle, whether the third laser is above or below specific thresholds defined relative to a marker point (e.g., center point) of the current node. G-PCC encoder 200 may use the third laser angle and a laser correction value for the third laser to determine a location of the beam of the third laser. Ranges between and beyond the thresholds may correspond to different contexts. G-PCC encoder 200 may then encode one or more bins of a syntax element (e.g., point_offset) indicating a vertical offset of the point by applying CABAC encoding using the determined context. The vertical offset of the point may indicate a vertical difference between the point and an origin point of the current node. A G-PCC coder, such as G-PCC encoder 200 or G-PCC decoder 300, may determine a context (idcmIdxAngular) for CABAC coding a bin of the syntax element point_offset using the process of Table 12. When performing the process of Table 12, the G-PCC coder may determine, based on the third laser angle, whether the third laser is above or below specific thresholds defined relative to a marker point (e.g., center point) of the current node.

TABLE 12

```
...
A relative laser position thetaLaserDeltaVirtualInterval relative to the
middle of the virtual interval is computed by:
    zLidar = ((posZlidarPartial[i][j] + halfIntervalSize
[j]) << 1) − 1
    theta = zLidar*rInv
    theta32 = theta >= 0 ? theta >> 15 : −((−theta) >> 15)
    thetaLaserDeltaVirtualInterval = ThetaLaser − theta32
Then, the angular context is deduced based on
thetaLaserDeltaVirtualInterval.
zShift = ( (rInv << ChildNodeSizeZLog2) >> 18 ) >> j
DeltaBottom = thetaLaserDeltaVirtualInterval + zShift
DeltaTop = thetaLaserDeltaVirtualInterval − zShift
idcmIdxAngular[i][j] = <!>thetaLaserDeltaVirtualInterval >=
0</!> ? 0 : 1
if (<!>DeltaTop >= 0</!>) idcmIdxAngular[i][j] += 2
Else if (<!>DeltaBottom < 0</!>) idcmIdxAngular[i][j] += 2
...
```

The terms in Table 12 may be determined as follows:
This process is performed after point_offset_x[i][ ] and point_offset_y[i][ ] are decoded such that PointOffsetX[i] and PointOffsetY[i] are known. The x and y position relative to the Lidar, of the point i is derived by:

```
posXlidar[i] = xNchild − lidar_head_position[0] + PointOffsetX[ i ]
posYlidar[i] = yNchild − lidar_head_position[1] + PointOffsetY[ i ]
``` where (xNchild, yNchild, zNchild) specify the position of the geometry octree child nodeChild in the current slice. The inverse rInv of the radial distance of the point from the LIDAR is determined by:

```
xLidar = (posXlidar[i] << 8) − 128
yLidar = (posYlidar[i] << 8) − 128
r2 = xLidar*xLidar + yLidar*yLidar
rInv = invSqrt (r2)
```

The corrected laser angle ThetaLaser of the laser associated with the child nodeChild is deduced as follows:

```
Hr = laser_correction [laserIndex [Child]] * rInv
ThetaLaser = laser_angle [laserIndex [Child]] +
(Hr >= 0 ? −(Hr >> 17) : ((−Hr) >>
17))
```

Assuming that the bits point_offset_z[i][j2] for j2 in the range 0 . . . j−1 are known, the point is known to belong to a virtual vertical interval whose half size is given by:

```
halfIntervalSize[j] = (1 << (EffectiveChildNodeSizeZLog2−1)) >> j
``` and a partial z point position posZlidarPartial[i][j], that provides the lower end of the interval, is deduced by:

```
PointOffsetZpartial = 0
for( j2 = 0; j2 < j; j2++ )
    PointOffsetZpartial [ i ] += point_offset_z[ i ][ j2 ] << j2
PointOffsetZpartial[ i ] <<= (EffectiveChildNodeSizeZLog2−j)
posZlidarPartial[i][j] = zNchild − lidar_head_position[2] +
PointOffsetZpartial[ i ]
```

In some examples where a node is coded using planar mode, G-PCC encoder 200 uses the third laser angle to determine a context for CABAC coding a syntax element (e.g., plane_position) indicating a position of a horizontal plane through the current node. For instance, a G-PCC coder, such as G-PCC encoder 200 or G-PCC decoder 300, may determine the context (contextAngular) for CABAC coding the plane position of a node (Child) as shown in Table 13, below.

TABLE 13

...
Firstly, the corrected angular difference relative to the center of the node is determined.
thetaLaserDelta = laser_angle [laserIndex [Child]] − theta32
Hr = laser_correction [laserIndex [Child]] * rInv
thetaLaserDelta += Hr >= 0 ? −(Hr >> 17) : ((−Hr) >> 17)
Then, the angular context is deduced.
zShift = (rInv << ChildNodeSizeZLog2) >> 20
DeltaBottom = thetaLaserDelta + zShift TABLE 13-continued DeltaTop = thetaLaserDelta − zShift
contextAngularfChild] = <!>thetaLaserDelta >= 0</!> ? 0 : 1
if (<!>DeltaTop >= 0</!>) contextAngular[Child] += 2
else if (<!>DeltaBottom < 0</!>) contextAngular[Child] += 2
...

In Table 13, rInv may be determined as:

```
r2 = xLidar*xLidar + yLidar*yLidar
rInv = invSqrt (r2)
``` where

```
midNodeX = 1 << (ChildNodeSizeXLog2 − 1)
midNodeY = 1 << (ChildNodeSizeXLog2 − 1)
xLidar = abs( ((xNchild − lidar_head_position[0] +
midNodeX) << 8) − 128 )
yLidar = abs( ((yNchild − lidar_head_position[1] +
midNodeY) << 8) − 128 )
``` where ChildNodeSizeXLog 2 represents the log base 2 of the x-dimension of the node (Child). An angle theta32 may be determined for the child node as:

```
zLidar = ((zNchild − lidar_head_position [2] + midNodeY) << 1) − 1
theta = zLidar*rInv
theta32 = theta >= 0 ? theta >> 15 : −((−theta) >> 15)
``` where zNchild specifies the z position of the geometry child node (Child) in a current slice.

Figure 7B:
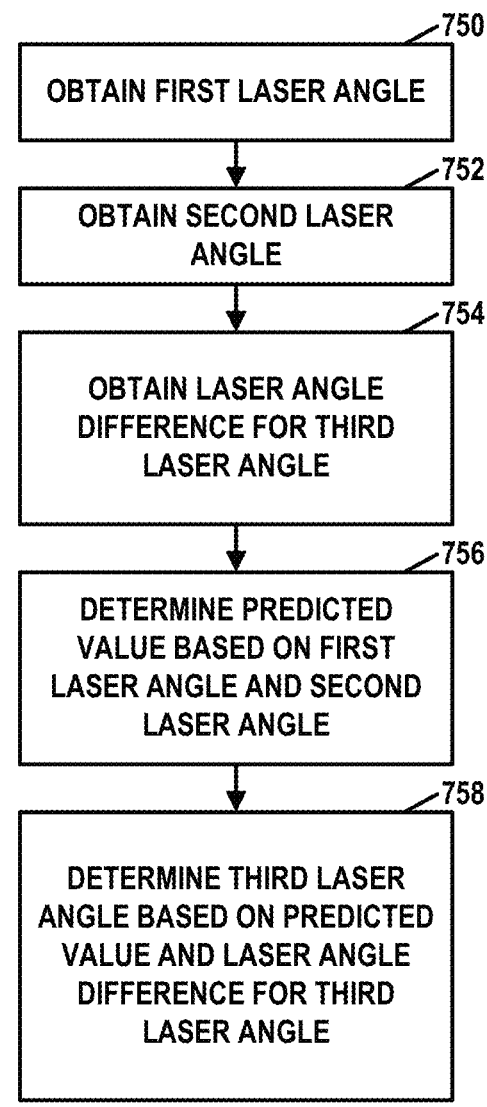
FIG. 7B is a flowchart illustrating an example operation of a G-PCC decoder in accordance with one or more techniques of this disclosure.

FIG. 7B is a flowchart illustrating an example operation of G-PCC decoder 300 in accordance with one or more techniques of this disclosure. In the example of FIG. 7B, G-PCC decoder 300 (e.g., geometry reconstruction unit 312 of G-PCC decoder 300) may obtain (e.g., determine) a first laser angle (750). The first laser angle may be a tangent of an elevation angle of a first laser beam relative to a horizontal plane defined by the first axis and the second axis of the point cloud data. Additionally, G-PCC decoder 300 may obtain a second laser angle (752). The second laser angle may be a tangent of an elevation angle of a second laser beam relative to the horizontal plane defined by the first axis and the second axis of the point cloud data. In some examples, G-PCC decoder 300 may determine the first laser angle from the value of a syntax element (e.g., laser_angle) encoded in geometry bitstream 203. In some examples, G-PCC decoder 300 may determine the first laser angle and/or the second laser angle from previously determined laser angles and additional syntax elements (e.g., laser_angle_diff) encoded in geometry bitstream 203. In other words, G-PCC decoder 300 may determine a laser angle for laser i as:

```
LaserAngle[i] = LaserAngle[i − 1] + laser_angle_diff[i]
```

In some examples, G-PCC decoder 300 may decode a laser angle difference syntax element (e.g., laser_angle_diff) for the second laser angle, wherein the laser angle difference syntax element for the second laser angle is a signed integer 0-th order Exp-Golomb-coded syntax element with left bit first.

Furthermore, in the example of FIG. 7B, G-PCC decoder 300 may obtain a laser angle difference (e.g., a laser_angle_diff syntax element) for a third laser angle (754). The third laser angle is a tangent of an elevation angle of a third laser beam relative to the horizontal plane defined by the first axis and the second axis of the point cloud data. In some examples, the laser angle difference is encoded in geometry bitstream 203 as a signed integer 0-th order Exponential-Golomb code and G-PCC decoder 300 may determine a value corresponding to this code. In other words, G-PCC decoder 300 may decode the laser angle difference for the third laser angle as a signed integer 0-th order Exp-Golomb-coded syntax element with left bit first.

G-PCC decoder 300 may determine a predicted value based on the first laser angle and the second laser angle (756). For instance, G-PCC decoder 300 may determine the predicted value by performing a linear prediction based on the first laser angle and the second laser angle. In other examples, G-PCC decoder 300 may determine the predicted value by applying weighted prediction using the first laser angle and the second laser angle.

G-PCC decoder 300 may determine the third laser angle based on the predicted value and the laser angle difference for the third laser angle (758). For example, G-PCC decoder 300 may add the laser angle difference for the third laser angle to the predicted value to determine the third laser angle.

In some examples, G-PCC decoder 300 may decode a point of the point cloud data based on one of the first laser angle, the second laser angle, and the third laser angle. For instance, G-PCC decoder 300 may decode a vertical position of a point of the point cloud based on the third laser angle and, in some examples, a laser correction value of a laser having the third laser angle. For example, G-PCC decoder 300 may decode, based on the third laser angle (and, in some examples, the laser correction value of the laser having the third laser angle), a position of the third laser beam relative to a marker point (e.g., center point, origin point, etc.) of a current node that contains the point. G-PCC decoder 300 may determine a context based on the position of the third laser beam relative to the current node. For instance, G-PCC decoder 300 may determine the context based on whether the third laser beam is within specific intervals defined by distance thresholds above and below the marker point, e.g., as described above with respect to Table 12. G-PCC decoder 300 (e.g., geometry arithmetic decoding unit 302 of G-PCC decoder 300) then may decode one or more bins of a syntax element (e.g., point_pos) indicating a vertical offset of the point relative to an origin point of the current node by applying CABAC decoding using the determined context. G-PCC decoder 300 may then determine the vertical position of the point based on the vertical offset of the point and the origin point of the current node. For instance, G-PCC decoder 300 may add the vertical offset of the point to the vertical coordinate of the origin point of the current node to determine the vertical position of the point.

In some examples where the current node containing the point is encoded using planar mode, G-PCC decoder 300 may, as part of decoding the position of the point of the point cloud based on the third laser angle, decode a syntax element indicating a vertical plane position (e.g., plane_position) based on the third laser angle and, in some examples, a laser correction value of a laser having the third laser angle. For instance, G-PCC decoder 300 may determine a context based on whether the third laser beam is within specific intervals defined by distance thresholds above and below a marker point of the current node, e.g., as described above with respect to Table 13. G-PCC decoder 300 may use the third laser angle and, in some examples, the laser correction value of the laser having the third laser angle, to determine a location of the third laser beam. G-PCC decoder 300 may decode one or more bins of the syntax element indicating the vertical plane position by applying CABAC decoding using the determined context. G-PCC decoder 300 may then decode the position of the point based on the syntax element indicating the vertical plane position. For instance, G-PCC decoder 300 may determine a position of a horizontal plane that divides the current node into an upper tier of child nodes and a lower tier of child nodes. G-PCC decoder 300 may determine that the point is in a child node in a tier of child nodes immediately above the horizontal plane.

For azimuthal mode coding, G-PCC encoder 200 may encode a syntax element (e.g., laser_numphi_perturn) that specifies the number of probes in the azimuth direction of a laser beam (e.g., for one full rotation of the laser beam or other range). The syntax element laser_numphi_perturn[i] is encoded directly using ue(v). ue(v) indicates an unsigned integer 0-th order Exp-Golomb-coded syntax element with the left bit first. However, the value of this syntax element (e.g., laser_numphi_perturn) for a specific laser is strongly correlated with the values of this syntax element for neighbor lasers. Thus, exploiting this correlation may improve the efficiency associated with coding these syntax elements (e.g., laser_numphi_perturn syntax elements).

This disclosure describes techniques that may exploit the correlation between values of syntax elements indicating numbers of probes in the azimuth direction of laser beams (e.g., for one full rotation of the laser beams or other range). For instance, in some examples of this disclosure, instead of directly coding the laser_numphi_perturn[i] syntax elements, G-PCC encoder 200 may predict a value of laser_numphi_perturn[i] from laser_numphi_per_turn[i−1] for i>=1. In other words, the G-PCC coder may predict the number of probes in the azimuth direction of a laser i (e.g., for one full rotation of the laser i or other range) from the number of probes in the azimuth direction of a laser i−1 (e.g., for one full rotation of laser i−1 or other range). G-PCC encoder 200 may derive a difference (e.g., laser_numphi_perturn_diff[i]), which is equal to (laser_numphi_per_turn[i]−laser_numphi_perturn[i−1]), and then encode the difference. G-PCC decoder 300 may use the number of probes in the azimuth direction of laser beam i−1 (e.g., for one full rotation of the laser beams or other range) and add the value of laser_numphi_perturn_diff[i] to determine the number of probes in the azimuth direction of laser beam i (e.g., for one full rotation of the laser beams or other range). Changes to the syntax and semantics of w19328_d2 corresponding to this example are shown in Table 14, below, with <!> . . . </!> tags.

TABLE 14

| | |
|---|---|
| number_laser_sminus1 | ue(v) |
| laser_angle[ 0 ] | se(v) |
| laser_correction[ 0 ] | se(v) |
| laser_numphi_perturn[O] | ue(v) |
| for( i = 1; i <= number_lasers_minus1; i++ ) { | |
|    laser_angle_diff[ i ] | ue(v) |
|    laser_correction_diff[ i ] | se(v) |
| <!>   laser_numphi_perturn_diff[ i ]</!> | <!>se(v)</!> |
| } | | laser_numphi_perturn[i] and laser_numphi_perturn_diff [i], for i in the range 0 . . . number_lasers_minus1, specifies the correction, along the second internal axis, of the i-th laser position relative to the geomAngularOrigin[2]. When not present, laser correction[i] is inferred to be 0.

The arrays LaserAngle and LaserCorrection, with elements laserAngle[i] and LaserCorrection[i], for i in the range of 0 . . . number_lasers_minus1, are derived as follows:

```
LaserAngle[0] = laser_angle[0]
LaserCorrection[0] = laser_correction[0]
for (i = 1; i <= number_lasers_minus1; i++) {
    LaserAngle[i] = LaserAngle[i - 1] +
laser_angle_diff[i]
    LaserCorrection[i] = LaserCorrection[i - 1] +
laser_correction_diff[i]
}
``` laser_numphi_perturn[i] and laser_numphi_perturn_diff [i] for i in the range 0 . . . number_lasers_minus1, specify the number of probes in the azimuth direction for one full rotation of the i-th laser. When not present, laser_numphi_perturn[i] is inferred to be 0.

```
LaserAngle[0] = laser_angle[0]
LaserCorrection[0] = laser_correction[0]
<!>LaserNumPhiPerTurn[0] = laser_numphi_perturn[0]</!>
for (i = 1; i <= number_lasers_minus1; i++) {
    LaserAngle[i] = LaserAngle[i - 1] +
laser_angle_diff[i]
    LaserCorrection[i] = LaserCorrection[i - 1] +
laser_correction_diff[i]
    <!>LaserNumPhiPerTurn [i] = LaserNumPhiPerTurn [i -
1] + laser_numphi_perturn_diff[i]</!>
}
```

Thus, in some examples, G-PCC encoder 200 may encode a syntax element specifying a value for a first laser (e.g. similar to laser_numphi_perturn[0] in Table 14), the value for the first laser indicating a number of probes in an azimuth direction for one full rotation of the first laser; encode a syntax element for a second laser (e.g., similar to laser_numphi_perturn_diff[i] in Table 14), wherein the syntax element for the second laser indicates a difference between the value for the first laser and a value for the second laser, the value for the second laser indicating a number of probes in the azimuth direction for one full rotation of the second laser; and encode one or more points of the point cloud data based on one of the number of probes in an azimuth direction of the first laser and the number of probes in the azimuth direction for one full rotation of the second laser.

Similarly, G-PCC decoder 300 may determine a value for a first laser (e.g. LaserNumPhiPerTurn[0] in the syntax above), the value for the first laser indicating a number of probes in an azimuth direction for one full rotation of the first laser. Additionally, G-PCC decoder 300 may decode a syntax element for a second laser (e.g., laser_numphi_perturn_diff[i] in Table 14). The syntax element for the second laser indicates a difference between the value for the first laser and a value for the second laser, where the value for the second laser may indicate a number of probes in the azimuth direction for one full rotation of the second laser. G-PCC decoder 300 may determine the value for the second laser indicating a number of probes in the azimuth direction of the second laser (e.g., LaserNumPhiPerTurn [i]=LaserNumPhiPerTurn [i−1]+laser_numphi_perturn_diff[i] in the syntax above) based on the value for the first laser and the indication of the difference between the value for the first laser and the value for the second laser. Further, G-PCC decoder 300 may decode one or more points of the point cloud data based on the number of probes in the azimuth direction for one full rotation of the second laser.

Figures 8A, 8B:
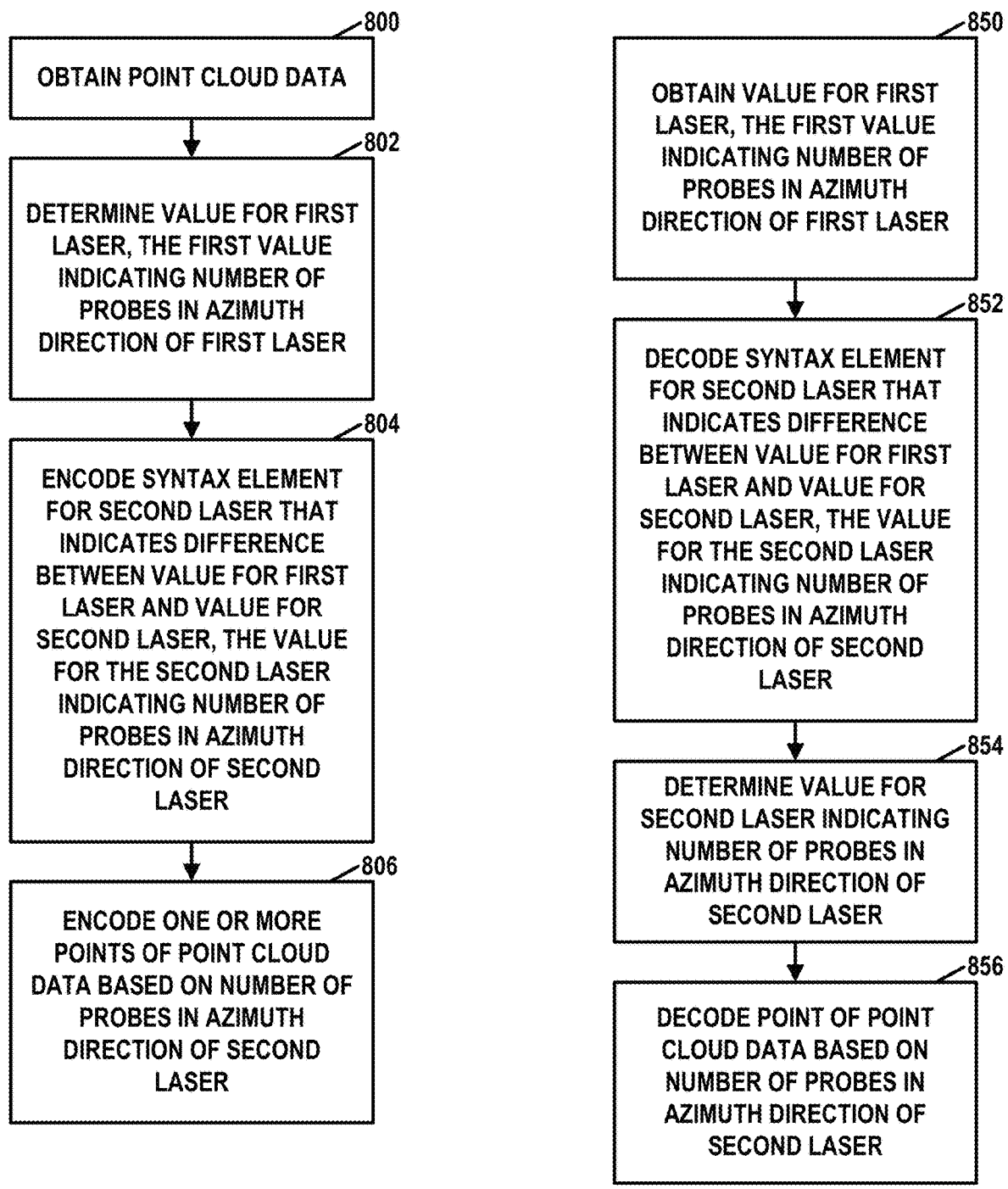
FIG. 8A is a flowchart illustrating an example operation of a G-PCC encoder in accordance with one or more techniques of this disclosure.
FIG. 8B is a flowchart illustrating an example operation of a G-PCC decoder in accordance with one or more techniques of this disclosure.

FIG. 8A is a flowchart illustrating an example operation of G-PCC encoder 200 in accordance with one or more techniques of this disclosure. In the example of FIG. 8A, G-PCC encoder 200 may obtain point cloud data (800). For example, G-PCC encoder 200 may obtain the point cloud from data source 104 (FIG. 1). Data source 104 may generate the point cloud using a LIDAR sensor, one or more cameras, computer graphics programs, or other sources.

G-PCC encoder 200 may determine a value (e.g., LaserNumPhiPerTurn) for a first laser (802). The value for the first laser indicates a number of probes in an azimuth direction of the first laser (e.g., for one full rotation of the first laser or other range). For instance, G-PCC encoder 200 may determine the value for the first laser based on configuration information regarding a LIDAR system (or other system) provided to G-PCC encoder 200. In some examples, G-PCC encoder 200 may encode a syntax element (e.g., laser_num_phi_perturn) specifying the value for the first laser.

Furthermore, in the example of FIG. 8A, G-PCC encoder 200 may encode a syntax element (e.g., laser_numphi_perturn cliff) for a second laser (804). The syntax element for the second laser indicates a difference between the value for the first laser and a value for the second laser. The value for the second laser indicates a number of probes in the azimuth direction of the second laser (e.g., for one full rotation of the second laser or other range). G-PCC encoder 200 may determine the value for the second laser based on configuration information regarding a LIDAR system (or other system) provided to G-PCC encoder 200. In some examples, G-PCC encoder 200 may encode the syntax element as a 0-th order Exponential-Golomb coded syntax element. G-PCC encoder 200 may include the encoded syntax element in geometry bitstream 203.

G-PCC encoder 200 may encode one or more points of the point cloud data based on the number of probes in the azimuth direction of the second laser (e.g., for one full rotation of the second laser or other range) (806). For example, G-PCC encoder 200 may determine, based on the number of probes in the azimuth direction of the second laser (e.g., for one full rotation of the second laser or other range), a sampling location of the second laser within a node containing a point. G-PCC encoder 200 may then determine a context based on the sampling location of the second laser within the node. For instance, G-PCC encoder 200 may determine the context in a process that is the same or similar to the process described in Table 12, above, using azimuth instead of elevation (z). G-PCC encoder 200 may then encode one or more bins of an azimuth offset syntax element (e.g., point_offset) indicating an azimuth offset of the point by applying CABAC encoding using the determined context.

In some examples where G-PCC encoder 200 uses angular mode to encode a node containing the point, G-PCC encoder 200 may determine, based on the number of probes in the azimuth direction of the second laser (e.g., for one full rotation of the second laser or other range), a sampling location of the second laser in a node containing a point of the one or more points. Additionally, in this example, G-PCC encoder 200 may determine a context based on the sampling location. For instance, G-PCC encoder 200 may determine the context in a process that is the same or similar to the process described in Table 13, above, using azimuth instead of elevation (z). G-PCC encoder 200 may encode a syntax element indicating a position of a plane passing through the node containing the point by applying CABAC encoding using the determined context. G-PCC encoder 200 may determine a position of the point based on the position of the plane.

FIG. 8B is a flowchart illustrating an example operation of G-PCC decoder 300 in accordance with one or more techniques of this disclosure. In the example of FIG. 8B, G-PCC decoder 300 may obtain a value (e.g., LaserNumPhiPerTurn) for a first laser (850). The value for the first laser indicates a number of probes in an azimuth direction of the first laser (e.g., for one full rotation of the first laser or other range). For instance, G-PCC decoder 300 may determine the value for the first laser as the value of a syntax element (e.g., laser_numphi_perturn[0]) that specifies the number of probes in the azimuth direction of the first laser (e.g., for one full rotation of the first laser or other range)). In some examples, G-PCC decoder 300 may obtain the value for the first laser by adding a value of a syntax element (e.g., laser_numphi_perturn_diff) to a value that indicates the number of probes in the azimuth direction for a previous laser.

Additionally, G-PCC decoder 300 may decode a syntax element (e.g., laser_numphi_perturn_diff) for a second laser (852). The syntax element for the second laser indicates a difference between the value for the first laser and a value for the second laser (e.g., LaserNumPhiPerTurn). The value for the second laser indicating a number of probes in the azimuth direction of the second laser (e.g., for one full rotation of the second laser or other range). In some examples, decoding the syntax element for the second laser includes converting a 0-th order Exponential-Golomb code into a value of the syntax element for the second laser.

G-PCC decoder 300 may determine the value for the second laser indicating the number of probes in the azimuth direction of the second laser based on the first value and the indication of the difference between the value for the first laser and the value for the second laser (854). For instance, G-PCC decoder 300 may add the value for the first laser to the syntax element for the second laser to determine the value for the second laser.

G-PCC decoder 300 may determine one or more points of the point cloud based on the number of probes in the azimuth direction for one full rotation of the laser (e.g., for one full rotation of the second laser or other range) (856). For example, G-PCC decoder 300 may determine, based on the number of probes in the azimuth direction for one full rotation of the laser (e.g., for one full rotation of the second laser or other range), a sampling location (e.g., predPhi) of the second laser in a current node containing a point. G-PCC decoder 300 may then determine a context (e.g., idcmIdxAzimuthal) based on the sampling location. G-PCC decoder 300 may determine the context in a process that is the same or similar to determining the context idcmIdxAngular in Table 12, above, using azimuth instead of elevation (z). In this example, G-PCC decoder 300 may then decode one or more bins of an azimuth offset syntax element (e.g., point_offset) indicating an azimuth offset of the point by applying CABAC decoding using the determined context. The azimuthal offset may indicate an offset of the point's azimuth coordinate relative to an original point of the current node. G-PCC decoder 300 may determine a position of the point based on the azimuth offset syntax element. For instance, G-PCC decoder 300 may convert cylindrical coordinates (including the azimuth coordinate) of the point into Cartesian coordinates.

In some examples where a node is encoded using angular mode, G-PCC decoder 300 may determine, based on the number of probes in the azimuth direction of the second laser (e.g., for one full rotation of the second laser or other range), a sampling location of the second laser in a node containing a point of the one or more points. Additionally, G-PCC decoder 300 may determine a context based on the sampling location. For instance, G-PCC decoder 300 may determine the context based on whether the sampling location is before or after a midpoint of the node in a direction of rotation of the second laser. G-PCC decoder 300 may determine the context in a process that is the same or similar to determining the context in Table 13, above, using azimuth instead of elevation (z). Furthermore, in this example, G-PCC decoder 300 may decode a syntax element (e.g., plane_position) indicating a position of a plane passing through the node containing the point by applying CABAC decoding using the determined context. G-PCC decoder 300 may determine a position of the point based on the position of the plane. For instance, G-PCC decoder 300 may determine that the point is in a tier of child nodes immediately after the plane.

As mentioned above, a number_lasers syntax element may be coded in a parameter set, such as the geometry parameter set. The number_lasers syntax element indicates the number of lasers used for the angular coding mode. However, in accordance with one or more techniques of this disclosure, the number of lasers used for the angular coding mode may be coded (e.g., in a parameter set such as a geometry parameter set or other syntax header) as number_lasers_minusL so that the number of lasers is obtained by adding a value L to the coded number_lasers_minusL value. Thus, in some examples, a G-PCC coder (e.g., G-PCC encoder 200 or G-PCC decoder 300) may code a syntax element having a first value, wherein the first value plus a second value indicates a number of lasers, and wherein the second value is a minimum number of lasers.

In some examples, the value L is equal to 1, because there should be at least one laser for the angular mode to be useful in coding, for example, the planar mode's plane positions or IDCM's point position offsets. The number_lasers_minus1 syntax element may be coded in the bitstream using variable length codes, such as k-th order exponential Golomb codes, or fixed length codes. In some examples, the value L may be equal to a minimum number of lasers required for the angular mode to be useful in coding. In some examples, the number_lasers_minusL syntax element may be coded in the bitstream using variable length codes, such as k-th order exponential Golomb codes, or fixed length codes.

The geometry parameter set syntax table of w19328_d2 is modified as in Table 15, below, with modified text indicated with <!> . . . </!> tags. More specifically, Table 15 shows coding of number_of_lasers_minus1 in the geometry parameter set. In Table 15, <#> . . . </#> tags denote syntax elements related to the angular mode.

TABLE 15

| | Descriptor |
|---|---|
| geometry_parameter_set( ) { | |
| ... | ... |
|     geometry_planar_mode_flag | u(1) |
|     if( geometry_planar_mode_flag ){ | |
|         geom_planar_mode_th_idcm | ue(v) |
|         geom_planar_mode_th[ 1 ] | ue(v) |
|         geom_planar_mode_th[ 2 ] | ue(v) |
|     } | |
| <#>geometry_angular_mode_flag</#> | u(1) |
| <#>if( geometry_angular_mode_flag ){ </#> | |
| <#>    lidar_head_position[0] </#> | se(v) |
| <#>    lidar_head_position[1] </#> | se(v) |
| <#>    lidar_head_position[2] </#> | se(v) |
| <!>    number_lasers_minus1</!> | ue(v) |
| <#>    for( i = 0; i < (number_lasers_minus1 + 1); i++ ) {</#> | |
| <#>        laser_angle[ i ] </#> | se(v) |
| <#>        laser_correction[ i ] </#> | se(v) |
| <#>    }</#> | |
| <#>    planar_buffer_disabled</#> | u(1) |
| <#>    implicit_qtbt_angular_max_node_min_dim_log2_to_split_z</#> | se(v) |
| <#>    implicit_qtbt_angular_max_diff_to_split_z</#> | se(v) |
| <#>}</#> | |
|     neighbour_context_restriction_flag | u(1) |
|     inferred_direct_coding_mode_enabled_flag | u(1) |
| ... | |

The semantics of the number_lasers_minus1 syntax element is given by:

number_lasers_minus1 value plus 1 specifies the number of lasers used for the angular coding mode. When not present, number_lasers_minus1 is inferred to −1.

In Table 15, num_lasers_minus1 plus 1 specifies the number of lasers. Therefore, in Table 15, it is assumed that the minimum number of lasers is 1. However, angular mode eligibility requires the derivation of smallest angular delta, which is not possible if the number of lasers is 1. In other words, angular mode may only be used when there are two or more lasers. Hence, in a first example, because angular eligibility requires the smallest angle difference between two lasers, the minimum number of lasers is 2. Accordingly, the syntax element num_lasers_minus1 may be replaced using num_lasers_minus2. Thus, when the number of lasers is 1, angular mode is not applied. Changes to w19328_d2 are shown in Table 16 with <!> . . . </!> tags.

TABLE 16

| <!> | number_lasers_minus2</!> | <!>ue(v)</!> |
|---|---|---|
| | laser_angle[ 0 ] | se(v) |
| | laser_correction[ 0 ] | se(v) |
| | laser_numphi_perturn[0] | ue(v) |
| | for( i = 1; i <= number_lasers_minus1; i++ ) { | |
| |     laser_angle_diff[ i ] | ue(v) |
| |     laser_correction_diff[ i ] | se(v) |
| | } | | number_lasers_minus<!>2</!> plus <!>2</!> specifies the number of lasers used for the angular coding mode. When not present, number_lasers_minus<!>2</!> is inferred to be 0.

Thus, in some examples, G-PCC encoder 200 or G-PCC decoder 300 may encode or decode a syntax element (e.g., number_lasers_minus2), wherein a value of the syntax element plus 2 specifies a number of lasers used for an angular coding mode; and encode or decode the point cloud data using the angular coding mode.

In a second example, when using single laser coding, it is proposed to make all the nodes eligible (skipping the eligibility condition). The following changes are proposed for the determination of angular eligibility. The following process applies to a child node Child to determine the angular eligibility angular_eligible[Child] of the child node. If geometry_angular_mode_flag is equal to 0, angular_eligible[Child] is set to equal to 0. Otherwise, the following applies:

midNodeS = 1 << (ChildNodeSizeLog2[0] − 1)
midNodeT = 1 << (ChildNodeSizeLog2[1] − 1)
sLidar = Abs(((sNchild − geomAngularOrigin[0] + midNodeS) << 8) − 128)
tLidar = Abs(((tNchild − geomAngularOrigin[1] + midNodeT) << 8) − 128)
rL1 = (sLidar + tLidar) >> 1
deltaAngleR = deltaAngle × rL1
midNodeV = 1 << (ChildNodeSizeLog2[2] − 1)
if (<!>num_lasers_minus1 &&</!> deltaAngleR <= (midNodeV << 26))
    angular_eligible[Child] = 0
else
    angular_eligible[Child] = 1 where deltaAngle is the minimum angular distance between the lasers determined by <!>if(num_lasers_minus1)</!> deltaAngle = Min{ Abs(LaserAngle[i] − LaserAngle[j]) ; 0 ≤ i < j <= number_lasers_minus1 }, and where (sNchild, tNchild, vNchild) specifies the position of the geometry octree child node Child in the current slice.

Figure 9:
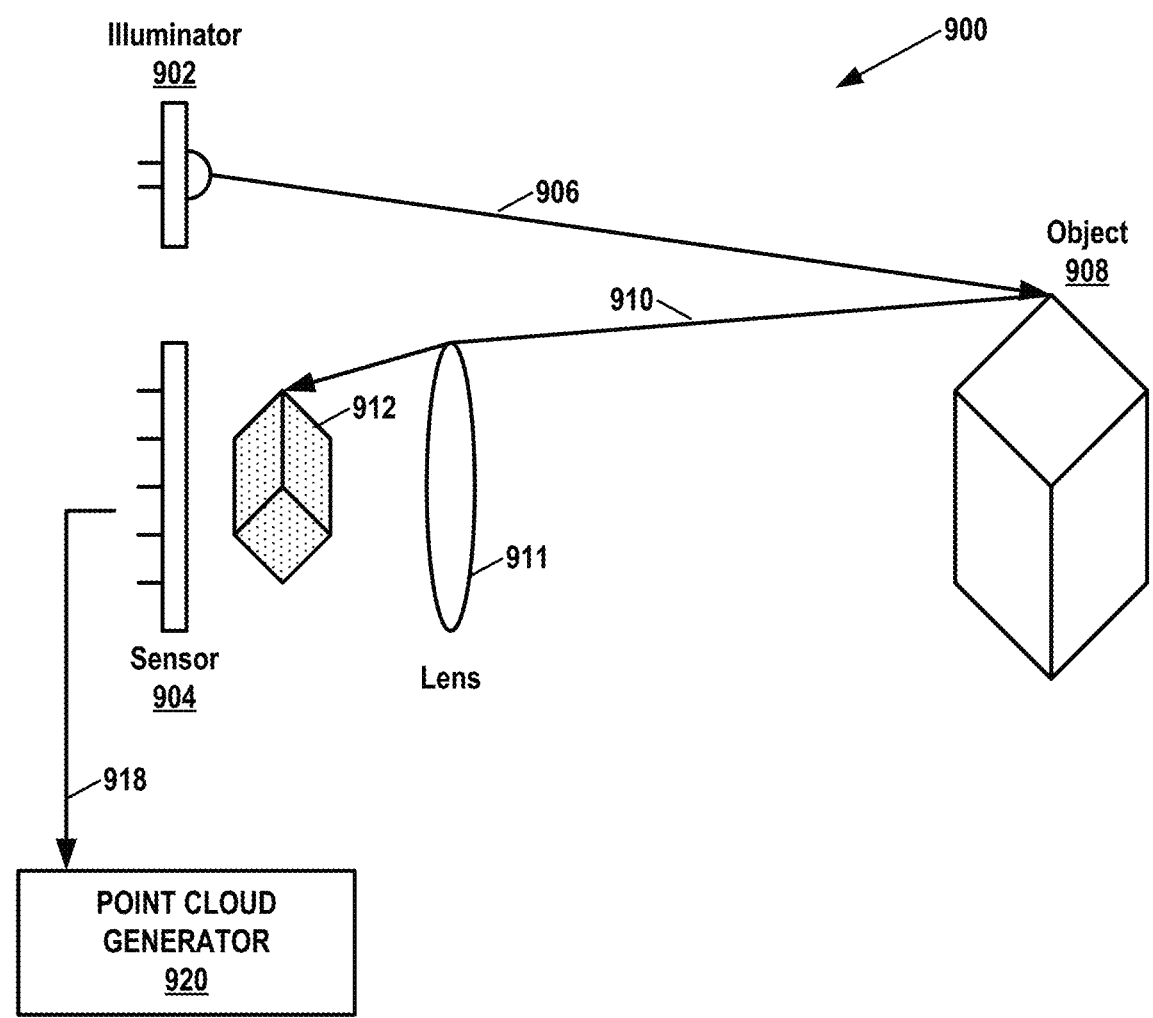
FIG. 9 is a conceptual diagram illustrating an example range-finding system that may be used with one or more techniques of this disclosure.

FIG. 9 is a conceptual diagram illustrating an example range-finding system 900 that may be used with one or more techniques of this disclosure. In the example of FIG. 9, range-finding system 900 includes an illuminator 902 and a sensor 904. Illuminator 902 may emit light 906. In some examples, illuminator 902 may emit light 906 as one or more laser beams. Light 906 may be in one or more wavelengths, such as an infrared wavelength or a visible light wavelength. In other examples, light 906 is not coherent, laser light. When light 906 encounters an object, such as object 908, light 906 creates returning light 910. Returning light 910 may include backscattered and/or reflected light. Returning light 910 may pass through a lens 911 that directs returning light 910 to create an image 912 of object 908 on sensor 904. Sensor 904 generates signals 914 based on image 912. Image 912 may comprise a set of points (e.g., as represented by dots in image 912 of FIG. 9).

In some examples, illuminator 902 and sensor 904 may be mounted on a spinning structure so that illuminator 902 and sensor 904 capture a 360-degree view of an environment. In other examples, range-finding system 900 may include one or more optical components (e.g., mirrors, collimators, diffraction gratings, etc.) that enable illuminator 902 and sensor 904 to detect objects within a specific range (e.g., up to 360-degrees). Although the example of FIG. 9 only shows a single illuminator 902 and sensor 904, range-finding system 900 may include multiple sets of illuminators and sensors.

In some examples, illuminator 902 generates a structured light pattern. In such examples, range-finding system 900 may include multiple sensors 904 upon which respective images of the structured light pattern are formed. Range-finding system 900 may use disparities between the images of the structured light pattern to determine a distance to an object 908 from which the structured light pattern backscatters. Structured light-based range-finding systems may have a high level of accuracy (e.g., accuracy in the sub-millimeter range), when object 908 is relatively close to sensor 904 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 900 is a time of flight (ToF)-based system. In some examples where range-finding system 900 is a ToF-based system, illuminator 902 generates pulses of light. In other words, illuminator 902 may modulate the amplitude of emitted light 906. In such examples, sensor 904 detects returning light 910 from the pulses of light 906 generated by illuminator 902. Range-finding system 900 may then determine a distance to object 908 from which light 906 backscatters based on a delay between when light 906 was emitted and detected and the known speed of light in air). In some examples, rather than (or in addition to) modulating the amplitude of the emitted light 906, illuminator 902 may modulate the phase of the emitted light 1404. In such examples, sensor 904 may detect the phase of returning light 910 from object 908 and determine distances to points on object 908 using the speed of light and based on time differences between when illuminator 902 generated light 906 at a specific phase and when sensor 904 detected returning light 910 at the specific phase.

In other examples, a point cloud may be generated without using illuminator 902. For instance, in some examples, sensor 904 of range-finding system 900 may include two or more optical cameras. In such examples, range-finding system 900 may use the optical cameras to capture stereo images of the environment, including object 908. Range-finding system 900 (e.g., point cloud generator 920) may then calculate the disparities between locations in the stereo images. Range-finding system 900 may then use the disparities to determine distances to the locations shown in the stereo images. From these distances, point cloud generator 920 may generate a point cloud.

Sensors 904 may also detect other attributes of object 908, such as color and reflectance information. In the example of FIG. 9, a point cloud generator 920 may generate a point cloud based on signals 918 generated by sensor 904. Range-finding system 900 and/or point cloud generator 920 may form part of data source 104 (FIG. 1).

Figure 10:
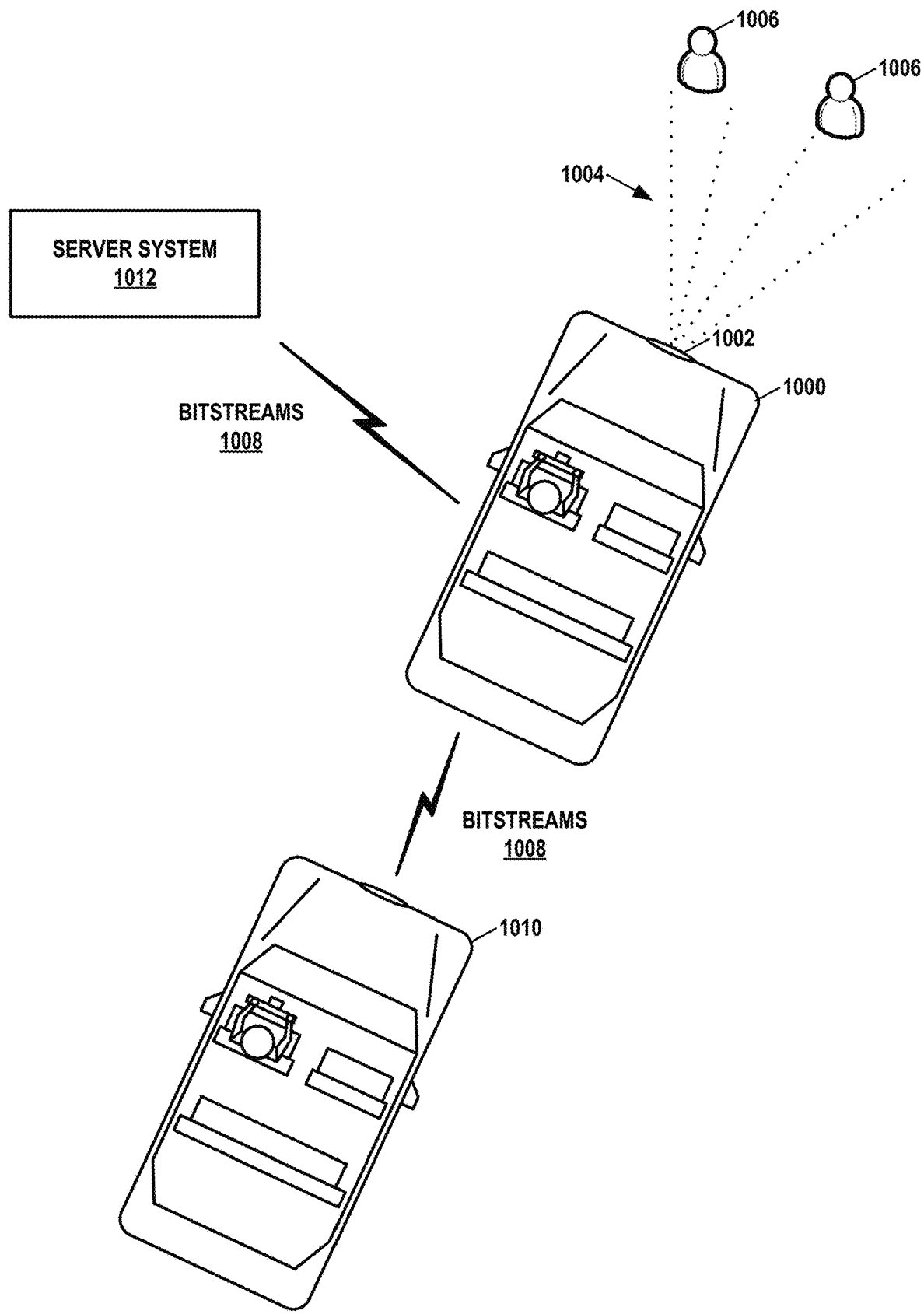
FIG. 10 is a conceptual diagram illustrating an example vehicle-based scenario in which one or more techniques of this disclosure may be used.

FIG. 10 is a conceptual diagram illustrating an example vehicle-based scenario in which one or more techniques of this disclosure may be used. In the example of FIG. 10, a vehicle 1000 includes a laser package 1002, such as a LIDAR system. Laser package 1002 may be implemented in the same manner as laser package 500 (FIG. 5). Although not shown in the example of FIG. 10, vehicle 1000 may also include a data source, such as data source 104 (FIG. 1), and a G-PCC encoder, such as G-PCC encoder 200 (FIG. 1). In the example of FIG. 10, laser package 1002 emits laser beams 1004 that reflect off pedestrians 1006 or other objects in a roadway. The data source of vehicle 1000 may generate a point cloud based on signals generated by laser package 1002. The G-PCC encoder of vehicle 1000 may encode the point cloud to generate bitstreams 1008, such as geometry bitstream 203 (FIG. 2) and attribute bitstream 205 (FIG. 2). Bitstreams 1008 may include many fewer bits than the unencoded point cloud obtained by the G-PCC encoder. An output interface of vehicle 1000 (e.g., output interface 108 (FIG. 1) may transmit bitstreams 1008 to one or more other devices. Thus, vehicle 1000 may be able to transmit bitstreams 1008 to other devices more quickly than the unencoded point cloud data. Additionally, bitstreams 1008 may require less data storage capacity.

The techniques of this disclosure may further reduce the number of bits in bitstreams 1008. For instance, determining a predicted value based on a first laser angle and a second laser angle, and determining a third laser angle based on the predicted value and a laser angle difference may reduce the number of bits in bitstreams 1008 associated with the third laser angle. Similarly, bitstream 1008 may include fewer bits when a G-PCC coder determines a value for a first laser, the value for the first laser indicating a number of probes in an azimuth direction of the first laser, decodes a syntax element for a second laser, wherein the syntax element for the second laser indicates a difference between the value for the first laser and a value for the second laser, the value for the second laser indicating a number of probes in the azimuth direction of the second laser; and determines one or more points of the point cloud data based on the number of probes in the azimuth direction of the second laser.

In the example of FIG. 10, vehicle 1000 may transmit bitstreams 1008 to another vehicle 1010. Vehicle 1010 may include a G-PCC decoder, such as G-PCC decoder 300 (FIG. 1). The G-PCC decoder of vehicle 1010 may decode bitstreams 1008 to reconstruct the point cloud. Vehicle 1010 may use the reconstructed point cloud for various purposes. For instance, vehicle 1010 may determine based on the reconstructed point cloud that pedestrians 1006 are in the roadway ahead of vehicle 1000 and therefore start slowing down, e.g., even before a driver of vehicle 1010 realizes that pedestrians 1006 are in the roadway. Thus, in some examples, vehicle 1010 may perform an autonomous navigation operation, generate a notification or warning, or perform another action based on the reconstructed point cloud.

Additionally or alternatively, vehicle 1000 may transmit bitstreams 1008 to a Server system 1012. Server system 1012 may use bitstreams 1008 for various purposes. For example, server system 1012 may store bitstreams 1008 for subsequent reconstruction of the point clouds. In this example, server system 1012 may use the point clouds along with other data (e.g., vehicle telemetry data generated by vehicle 1000) to train an autonomous driving system. In other example, server system 1012 may store bitstreams 1008 for subsequent reconstruction for forensic crash investigations (e.g., if vehicle 1000 collides with pedestrians 1006).

Figure 11:
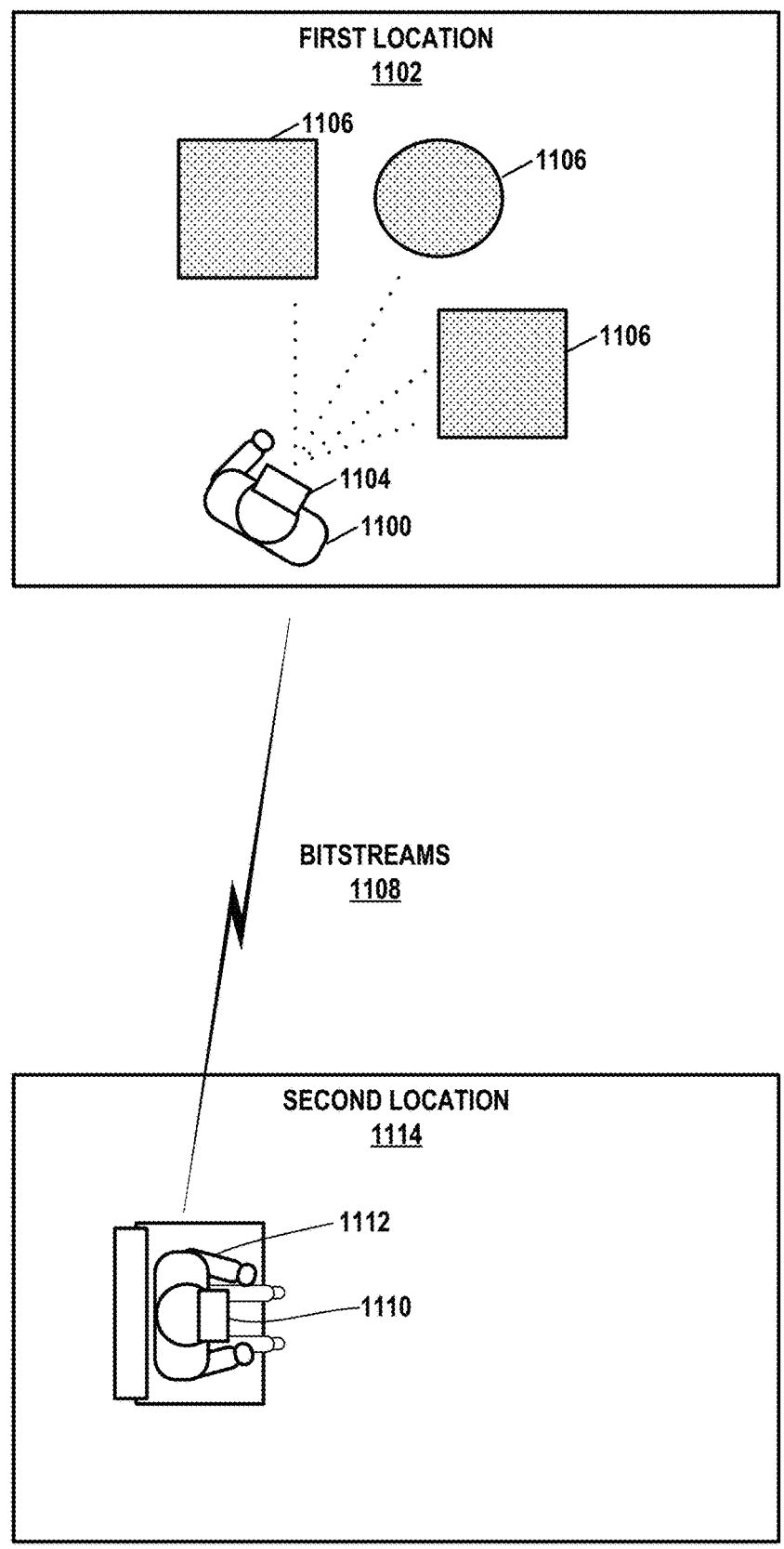
FIG. 11 is a conceptual diagram illustrating an example extended reality system in which one or more techniques of this disclosure may be used.

FIG. 11 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 11, a first user 1100 is located in a first location 1102. User 1100 wears an XR headset 1104. As an alternative to XR headset 1104, user 1100 may use a mobile device (e.g., mobile phone, tablet computer, etc.). XR headset 1104 includes a depth detection sensor, such as a LIDAR system, that detects positions of points on objects 1106 at location 1102. A data source of XR headset 1104 may use the signals generated by the depth detection sensor to generate a point cloud representation of objects 1106 at location 1102. XR headset 1104 may include a G-PCC encoder (e.g., G-PCC encoder 200 of FIG. 1) that is configured to encode the point cloud to generate bitstreams 1108.

The techniques of this disclosure may further reduce the number of bits in bitstreams 1108. For instance, determining a predicted value based on a first laser angle and a second laser angle, and determining a third laser angle based on the predicted value and a laser angle difference may reduce the number of bits in bitstreams 1108 associated with the third laser angle. Similarly, bitstream 1108 may include fewer bits when a G-PCC coder determines a value for a first laser, the value for the first laser indicating a number of probes in an azimuth direction of the first laser, decodes a syntax element for a second laser, wherein the syntax element for the second laser indicates a difference between the value for the first laser and a value for the second laser, the value for the second laser indicating a number of probes in the azimuth direction of the second laser; and determines one or more points of the point cloud data based on the number of probes in the azimuth direction of the second laser.

XR headset 1104 may transmit bitstreams 1108 (e.g., via a network such as the Internet) to an XR headset 1110 worn by a user 1112 at a second location 1114. XR headset 1110 may decode bitstreams 1108 to reconstruct the point cloud. XR headset 1110 may use the point cloud to generate an XR visualization (e.g., an AR, MR, VR visualization) representing objects 1106 at location 1102. Thus, in some examples, such as when XR headset 1110 generates a VR visualization, user 1112 at location 1114 may have a 3D immersive experience of location 1102. In some examples, XR headset 1110 may determine a position of a virtual object based on the reconstructed point cloud. For instance, XR headset 1110 may determine, based on the reconstructed point cloud, that an environment (e.g., location 1102) includes a flat surface and then determine that a virtual object (e.g., a cartoon character) is to be positioned on the flat surface. XR headset 1110 may generate an XR visualization in which the virtual object is at the determined position. For instance, XR headset 1110 may show the cartoon character sitting on the flat surface.

Figure 12:
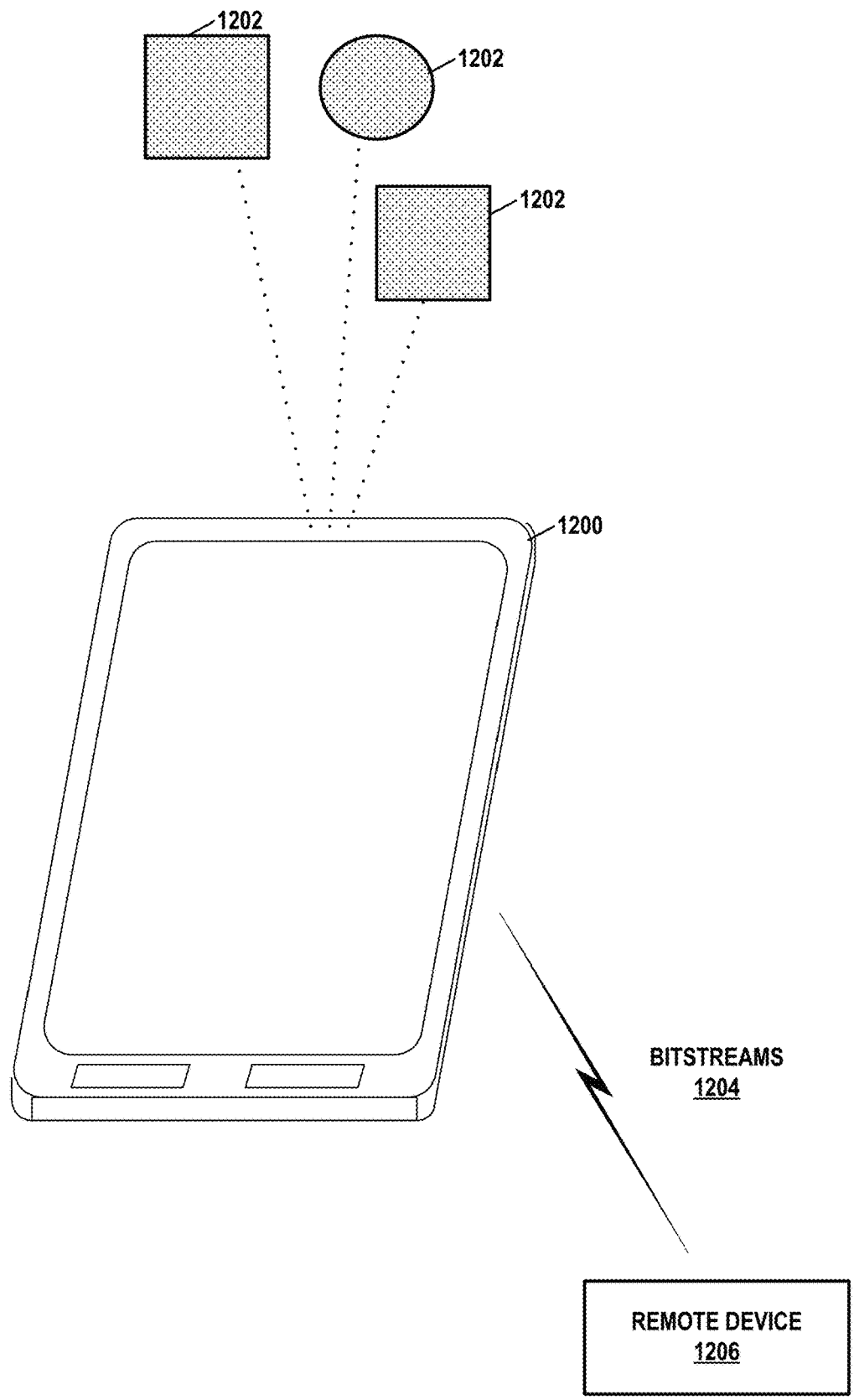
FIG. 12 is a conceptual diagram illustrating an example mobile device system in which one or more techniques of this disclosure may be used.

FIG. 12 is a conceptual diagram illustrating an example mobile device system in which one or more techniques of this disclosure may be used. In the example of FIG. 12, a mobile device 1200, such as a mobile phone or tablet computer, includes a depth detection sensor, such as a LIDAR system, that detects positions of points on objects 1202 in an environment of mobile device 1200. A data source of mobile device 1200 may use the signals generated by the depth detection sensor to generate a point cloud representation of objects 1202. Mobile device 1200 may include a G-PCC encoder (e.g., G-PCC encoder 200 of FIG. 1) that is configured to encode the point cloud to generate bitstreams 1204. In the example of FIG. 12, mobile device 1200 may transmit bitstreams to a remote device 1206, such as a server system or other mobile device. Remote device 1206 may decode bitstreams 1204 to reconstruct the point cloud. Remote device 1206 may use the point cloud for various purposes. For example, remote device 1206 may use the point cloud to generate a map of environment of mobile device 1200. For instance, remote device 1206 may generate a map of an interior of a building based on the reconstructed point cloud. In another example, remote device 1206 may generate imagery (e.g., computer graphics) based on the point cloud. For instance, remote device 1206 may use points of the point cloud as vertices of polygons and use color attributes of the points as the basis for shading the polygons. In some examples, remote device 1206 may perform facial recognition using the point cloud.

The techniques of this disclosure may further reduce the number of bits in bitstreams 1204. For instance, determining a predicted value based on a first laser angle and a second laser angle, and determining a third laser angle based on the predicted value and a laser angle difference may reduce the number of bits in bitstreams 1204 associated with the third laser angle. Similarly, bitstream 1204 may include fewer bits when a G-PCC coder determines a value for a first laser, the value for the first laser indicating a number of probes in an azimuth direction of the first laser, decodes a syntax element for a second laser, wherein the syntax element for the second laser indicates a difference between the value for the first laser and a value for the second laser, the value for the second laser indicating a number of probes in the azimuth direction of the second laser; and determines one or more points of the point cloud data based on the number of probes in the azimuth direction of the second laser.

Examples in the various aspects of this disclosure may be used individually or in any combination.

The following is a non-limiting list of aspects that may be in accordance with one or more techniques of this disclosure.

Aspect 1A: A method of processing a point cloud includes coding a vertical plane position of a planar mode in a node of an octree that represents 3-dimensional positions of points in the point cloud, wherein coding the vertical plane position of the planar mode comprises: determining a laser index of a laser candidate in a set of laser candidates, wherein the determined laser index indicates a position of a laser beam that intersects the node; determining a context index based on an intersection of the laser beam and the node; and arithmetically coding the vertical plane position of the planar mode using a context indicated by the determined context index.

Aspect 2A: The method of aspect 1A, wherein determining the context index comprises determining the context index based on whether the laser beam is positioned above or below a marker point, wherein the marker point is a center of the node.

Aspect 3A: The method of aspect 1A, wherein determining the context index comprises determining the context index based on whether the laser beam is positioned above a first distance threshold, below a second distance threshold, or between the first and second distance thresholds.

Aspect 4A: The method of aspect 1A, wherein determining the context index comprises determining the context index based on whether the laser beam is positioned above a first distance threshold, between the first distance threshold and a second distance threshold, between the second distance threshold and a third distance threshold, or below the third distance threshold.

Aspect 5A: A method of processing a point cloud includes coding a vertical point position offset within a node of an octree that represents 3-dimensional positions of points in the point cloud, wherein coding the vertical point position offset comprises: determining a laser index of a laser candidate in a set of laser candidates, wherein the determined laser index indicates a position of a laser beam that intersects the node; determining a context index based on an intersection of the laser beam and the node; and arithmetically coding bins of the vertical point position offset using a context indicated by the determined context index.

Aspect 6A: The method of aspect 5A, wherein determining the context index comprises determining the context index based on whether the laser beam is positioned above or below a marker point, wherein the marker point is a center of the node.

Aspect 7A: The method of aspect 5A, wherein determining the context index comprises determining the context index based on whether the laser beam is positioned above a first distance threshold, below a second distance threshold, or between the first and second distance thresholds.

Aspect 8A: The method of aspect 5A, wherein determining the context index comprises determining the context index based on whether the laser beam is positioned above a first distance threshold, between the first distance threshold and a second distance threshold, between the second distance threshold and a third distance threshold, or below the third distance threshold.

Aspect 9A: A method of processing a point cloud includes coding a syntax element having a first value, wherein the first value plus a second value indicates a number of lasers, wherein the second value is a minimum number of lasers.

Aspect 10A: The method of aspect 9A, wherein the syntax element is a first syntax element, the method further includes determining a laser index of a laser candidate in a set of laser candidates, wherein the set of laser candidates has the number of lasers, and the determined laser index indicates a position of a laser beam that intersects a node of an octree that represents 3-dimensional positions of points in the point cloud; determining a context index based on an intersection of the laser beam and the node; and arithmetically coding bins of a second syntax element using a context indicated by the determined context index.

Aspect 11A: A method of processing a point cloud includes determining a laser index of a laser candidate in a set of laser candidates, wherein the determined laser index indicates a position of a laser beam that intersects a node of an octree that represents positions of 3-dimensional positions of points in the point cloud; determining a context index based on an intersection of the laser beam and the node using an angular mode; and arithmetically coding bins of a second syntax element using a context indicated by the determined context index.

Aspect 12A: A method of processing a point cloud includes signaling, for each laser of the set of laser candidates, a corresponding laser angle and a corresponding laser offset.

Aspect 13A: The method of aspect 12A, further comprising the methods of any of aspects 1-11.

Aspect 14A: The method of any of aspects 1A-13A, further comprising generating the point cloud.

Aspect 15A: A device for processing a point cloud, the device comprising one or more means for performing the method of any of aspects 1A-14A.

Aspect 16A: The device of aspect 15, wherein the one or more means comprise one or more processors implemented in circuitry.

Aspect 17A: The device of any of aspects 15A or 16A, further comprising a memory to store the data representing the point cloud.

Aspect 18A: The device of any of aspects 15A-17A, wherein the device comprises a decoder.

Aspect 19A: The device of any of aspects 15A-18A, wherein the device comprises an encoder.

Aspect 20A: The device of any of aspects 15A-19A, further comprising a device to generate the point cloud.

Aspect 21A: The device of any of aspects 15A-20A, further comprising a display to present imagery based on the point cloud.

Aspect 22A: A computer-readable storage medium having stored thereon instructions that, when executed, cause one or more processors to perform the method of any of aspects 1A-14A.

Aspect 1B. A method of decoding a point cloud, the method comprising: determining a first laser angle; determining a second laser angle; decoding a laser angle difference syntax element for a third laser angle, wherein the laser angle difference syntax element indicates a laser angle difference for the third laser angle; and predicting the third laser angle based on the first laser angle, the second laser angle, and the laser angle difference for the third laser angle.

Aspect 2B. The method of aspect 1B, wherein decoding the laser angle difference syntax element for the third laser angle comprises decoding the laser angle difference syntax element for the third laser angle as a signed integer 0-th order Exp-Golomb-coded syntax element with left bit first.

Aspect 3B. The method of any of aspects 1B-2B, wherein determining the second laser angle comprises decoding a laser angle difference syntax element for the second laser angle, wherein the laser angle difference syntax element for the second laser angle is an unsigned integer 0-th order Exp-Golomb-coded syntax element with left bit first.

Aspect 4B. The method of any of aspects 1B-3B, wherein predicting the third laser angle comprises performing a linear prediction to determine the third laser angle based on the first laser angle, the second laser angle, and the laser angle difference for the third laser angle.

Aspect 5B. The method of any of aspects 1B-4B, wherein determining the position of the point in the point cloud based on the third laser angle comprises: decoding a vertical plane position syntax element based on the third laser angle; and determining the position of the point based on the vertical plane position syntax element.

Aspect 6B. The method of any of aspects 1B-5B, wherein the method further comprises decoding a laser information prediction indicator syntax element that specifies a method to derive laser information from the laser angle difference syntax element for the third laser angle.

Aspect 7B. The method of any of aspects 1B-6B, further comprising determining a position of a point in the point cloud based on the third laser angle.

Aspect 8B. A method of encoding a point cloud, the method comprising: determining a first laser angle; determining a second laser angle; determining a position of a point in the point cloud using a laser having a third laser angle; and encoding a laser angle difference syntax element for a third laser angle, wherein: the laser angle difference syntax element indicates a laser angle difference for the third laser angle, and the third laser angle is predictable based on the first laser angle, the second laser angle, and the laser angle difference for the third laser angle.

Aspect 9B. The method of aspect 8B, wherein encoding the laser angle difference syntax element for the third laser angle comprises encoding the laser angle difference syntax element for the third laser angle as a signed integer 0-th order Exp-Golomb-coded syntax element with left bit first.

Aspect 10B. The method of any of aspects 8B-9B, wherein the method further comprises encoding a laser angle difference syntax element for the second laser angle, wherein: the laser angle difference syntax element for the second laser angle indicates a difference between the second laser angle and the first laser angle, and the laser angle difference syntax element for the second laser angle is an unsigned integer 0-th order Exp-Golomb-coded syntax element with left bit first.

Aspect 11B. The method of any of aspects 8B-10B, wherein the third laser angle is predictable based on a linear prediction of the first laser angle, the second laser angle, and the laser angle difference for the third laser angle.

Aspect 12B. The method of any of aspects 8B-11B, wherein the method further comprises encoding a laser information prediction indicator syntax element that specifies a method to derive laser information from the laser angle difference syntax element for the third laser angle.

Aspect 13B. A method of decoding a point cloud, the method comprising: determining a value for a first laser, the value for the first laser indicating a number of probes in an azimuth direction for one full rotation of the first laser; and decoding a syntax element for a second laser, wherein the syntax element for the second laser indicates a difference between the value for the first laser and a value for the second laser, the value for the second laser indicating a number of probes in the azimuth direction for one full rotation of the second laser.

Aspect 14B. The method of aspect 13B, further comprising determining one or more points in the point cloud based on the number of probes in the azimuth direction for one full rotation of the second laser.

Aspect 15B. The method of aspect 13B, further comprising the methods of any of aspects 1B-7B.

Aspect 16B. A method of encoding a point cloud, the method comprising: determining a value for a first laser, the value for the first laser indicating a number of probes in an azimuth direction for one full rotation of the first laser; and encoding a syntax element for a second laser, wherein the syntax element for the second laser indicates a difference between the value for the first laser and a value for the second laser, the value for the second laser indicating a number of probes in the azimuth direction for one full rotation of the second laser.

Aspect 17B. The method of aspect 16B, further comprising encoding one or more points in the point cloud based on the number of probes in the azimuth direction for one full rotation of the second laser.

Aspect 18B. The method of aspect 16B, further comprising the methods of any of aspects 8-12.

Aspect 19B. A method of coding a point cloud, the method comprising: coding a syntax element, wherein a value of the syntax element plus 2 specifies a number of lasers used for an angular coding mode; and coding the point cloud using the angular coding mode.

Aspect 20B. A device for decoding a point cloud, the device comprising one or more means for performing the method of any of aspects 1B-7B, 13B-15B, or 19B.

Aspect 21B. A device for encoding a point cloud, the device comprising one or more means for performing the method of any of aspects 8B-12B or 16B-19B.

Aspect 22B. The device of any of aspects 20B or 21B, wherein the one or more means comprise one or more processors implemented in circuitry.

Aspect 23B. The device of any of aspects 20B-22B, further comprising a memory to store the data representing the point cloud.

Aspect 24B. The device of any of aspects 20B-23B, wherein the device comprises a decoder.

Aspect 25B. The device of any of aspects 20B-24B, wherein the device comprises an encoder.

Aspect 26B. The device of any of aspects 20B-25B, further comprising a device to generate the point cloud.

Aspect 27B. The device of any of aspects 20B-26B, further comprising a display to present imagery based on the point cloud.

Aspect 28B. A computer-readable storage medium having stored thereon instructions that, when executed, cause one or more processors to perform the method of any of aspects 1B-19B.

Aspect 1C: A device includes a memory configured to store point cloud data; and one or more processors coupled to the memory and implemented in circuitry, the one or more processors configured to: obtain a value for a first laser, the value for the first laser indicating a number of probes in an azimuth direction of the first laser; decode a syntax element for a second laser, wherein the syntax element for the second laser indicates a difference between the value for the first laser and a value for the second laser, the value for the second laser indicating a number of probes in the azimuth direction of the second laser; determine the value for the second laser indicating the number of probes in the azimuth direction of the second laser based on the first value and the indication of the difference between the value for the first laser and the value for the second laser; and decode a point of the point cloud data based on the number of probes in the azimuth direction of the second laser.

Aspect 2C: The device of aspect 1C, wherein the one or more processors are configured to, as part of obtaining the value for the first laser, decode a syntax element specifying the value for the first laser.

Aspect 3C: The device of aspect 1C or aspect 2C, wherein the one or more processors are configured to, as part of decoding the point of the point cloud data: determine, based on the number of probes in the azimuth direction of the second laser, a sampling location of the second laser in a node containing a point of the one or more points; determine a context based on the sampling location; decode one or more bins of an azimuth offset syntax element indicating an azimuth offset of the point by applying context adaptive binary arithmetic coding (CABAC) decoding using the determined context; and determine a position of the point based on the azimuth offset syntax element.

Aspect 4C: The device of any of aspects 1C-3C, wherein the one or more processors are configured to, as part of decoding the point of the point cloud data: determine, based on the number of probes in the azimuth direction of the second laser, a sampling location of the second laser in a node containing the point; determine a context based on the sampling location; decode a syntax element indicating a position of a plane passing through the node containing the point by applying context adaptive binary arithmetic coding (CABAC) decoding using the determined context; and determine a position of the point based on the position of the plane.

Aspect 5C: The device of any of aspects 1C-4C, further comprising a display to present imagery based on the point cloud data.

Aspect 6C: The device of any of aspects 1C-5C, wherein the value for the first laser indicates a number of probes in the azimuth direction for one full rotation of the first laser and the value for the second laser indicates a number of probes in the azimuth direction for one full rotation of the second laser.

Aspect 7C: A device includes a memory configured to store point cloud data; and one or more processors coupled to the memory and implemented in circuitry, the one or more processors configured to: obtain the point cloud data; determine a value for a first laser, the value for the first laser indicating a number of probes in an azimuth direction of the first laser; encode a syntax element for a second laser, wherein the syntax element for the second laser indicates a difference between the value for the first laser and a value for the second laser, the value for the second laser indicating a number of probes in the azimuth direction of the second laser; and encode a point of the point cloud data based on the number of probes in the azimuth direction of the second laser.

Aspect 8C: The device of aspect 7C, wherein the one or more processors are further configured to encode a syntax element specifying the value for the first laser.

Aspect 9C: The device of aspect 7C or aspect 8C, wherein the one or more processors are configured to, as part of encoding the point of the point cloud: determine, based on the number of probes in the azimuth direction of the second laser, a sampling location of the second laser in a node containing the point; determine a context based on the sampling location; and encode one or more bins of an azimuth offset syntax element indicating an azimuth offset of the point by applying context adaptive binary arithmetic coding (CABAC) encoding using the determined context.

Aspect 10C: The device of any of aspects 7C-9C, wherein the one or more processors are configured to, as part of encoding the point of the point cloud data: determine, based on the number of probes in the azimuth direction of the second laser, a sampling location of the second laser in a node containing a point of the one or more points; determine a context based on the sampling location; and encode a syntax element indicating a position of a plane passing through the node containing the point by applying context adaptive binary arithmetic coding (CABAC) encoding using the determined context.

Aspect 11C: The device of any of aspects 7C-10C, wherein the value for the first laser indicates a number of probes in the azimuth direction for one full rotation of the first laser and the value for the second laser indicates a number of probes in the azimuth direction for one full rotation of the second laser.

Aspect 12C: The device of any of aspects 7C-11C, further comprising a sensor to generate the point cloud data.

Aspect 13C: A method of decoding point cloud data includes obtaining a value for a first laser, the value for the first laser indicating a number of probes in an azimuth direction of the first laser; decoding a syntax element for a second laser, wherein the syntax element for the second laser indicates a difference between the value for the first laser and a value for the second laser, the value for the second laser indicating a number of probes in the azimuth direction of the second laser; determining the value for the second laser indicating the number of probes in the azimuth direction of the second laser based on the first value and the indication of the difference between the value for the first laser and the value for the second laser; and decoding a point of the point cloud data based on the number of probes in the azimuth direction of the second laser.

Aspect 14C: The method of aspect 13C, wherein obtaining the value for the first laser comprises decoding a syntax element specifying the value for the first laser.

Aspect 15C: The method of aspect 13C or aspect 14C, wherein decoding the point of the point cloud data based on the number of probes in the azimuth direction of the second laser comprises: determining, based on the number of probes in the azimuth direction of the second laser, a sampling location of the second laser in a node containing a point of the one or more points; determining a context based on the sampling location; decoding one or more bins of an azimuth offset syntax element indicating an azimuth offset of the point by applying context adaptive binary arithmetic coding (CABAC) decoding using the determined context; and determining a position of the point based on the azimuth offset syntax element.

Aspect 16C: The method of any of aspects 13C-15C, wherein decoding the point of the point cloud data based on the number of probes in the azimuth direction of the second laser comprises: determining, based on the number of probes in the azimuth direction of the second laser, a sampling location of the second laser in a node containing the point; determining a context based on the sampling location; decoding a syntax element indicating a position of a plane passing through the node containing the point by applying context adaptive binary arithmetic coding (CABAC) decoding using the determined context; and determining a position of the point based on the position of the plane.

Aspect 17C: The method of any of aspects 13C-16C, wherein the value for the first laser indicates a number of probes in the azimuth direction for one full rotation of the first laser and the value for the second laser indicates a number of probes in the azimuth direction for one full rotation of the second laser.

Aspect 18C: A method of encoding point cloud data includes obtaining the point cloud data; determining a value for a first laser, the value for the first laser indicating a number of probes in an azimuth direction of the first laser; encoding a syntax element for a second laser, wherein the syntax element for the second laser indicates a difference between the value for the first laser and a value for the second laser, the value for the second laser indicating a number of probes in the azimuth direction of the second laser; and encoding a point of the point cloud data based on the number of probes in the azimuth direction of the second laser.

Aspect 19C: The method of aspect 18C, further comprising encoding a syntax element specifying the value for the first laser.

Aspect 20C: The method of aspect 18C or aspect 19C, wherein encoding the point of the point cloud data based on the number of probes in the azimuth direction of the second laser comprises: determining, based on the number of probes in the azimuth direction of the second laser, a sampling location of the second laser in a node containing the point; determining a context based on the sampling location; and encoding one or more bins of an azimuth offset syntax element indicating an azimuth offset of the point by applying context adaptive binary arithmetic coding (CABAC) encoding using the determined context.

Aspect 21C: The method of any of aspects 18C-20C, wherein encoding the point of the point cloud data based on the number of probes in the azimuth direction of the second laser comprises: determining, based on the number of probes in the azimuth direction of the second laser, a sampling location of the second laser in a node containing a point of the one or more points; determining a context based on the sampling location; and encoding a syntax element indicating a position of a plane passing through the node containing the point by applying context adaptive binary arithmetic coding (CABAC) encoding using the determined context.

Aspect 22C: The method of any of aspects 18C-21C, wherein the value for the first laser indicates a number of probes in the azimuth direction for one full rotation of the first laser and the value for the second laser indicates a number of probes in the azimuth direction for one full rotation of the second laser.

Aspect 23C: A device for decoding point cloud data includes means for obtaining a value for a first laser, the value for the first laser indicating a number of probes in an azimuth direction of the first laser; means for decoding a syntax element for a second laser, wherein the syntax element for the second laser indicates a difference between the value for the first laser and a value for the second laser, the value for the second laser indicating a number of probes in the azimuth direction of the second laser; means for determining the value for the second laser indicating the number of probes in the azimuth direction of the second laser based on the first value and the indication of the difference between the value for the first laser and the value for the second laser; and means for decoding a point of the point cloud data based on the number of probes in the azimuth direction of the second laser.

Aspect 24C: A device for encoding point cloud data includes means for obtaining the point cloud data; means for determining a value for a first laser, the value for the first laser indicating a number of probes in an azimuth direction of the first laser; means for encoding a syntax element for a second laser, wherein the syntax element for the second laser indicates a difference between the value for the first laser and a value for the second laser, the value for the second laser indicating a number of probes in the azimuth direction of the second laser; and means for encoding a point of the point cloud data based on the number of probes in the azimuth direction of the second laser.

Aspect 25C: A computer-readable storage medium having stored thereon instructions that, when executed, cause one or more processors to: obtain a value for a first laser, the value for the first laser indicating a number of probes in an azimuth direction of the first laser; decode a syntax element for a second laser, wherein the syntax element for the second laser indicates a difference between the value for the first laser and a value for the second laser, the value for the second laser indicating a number of probes in the azimuth direction of the second laser; determine the value for the second laser indicating the number of probes in the azimuth direction of the second laser based on the first value and the indication of the difference between the value for the first laser and the value for the second laser; and decode a point of point cloud data based on the number of probes in the azimuth direction of the second laser.

Aspect 26C: A computer-readable storage medium having stored thereon instructions that, when executed, cause one or more processors to: obtain point cloud data; determine a value for a first laser, the value for the first laser indicating a number of probes in an azimuth direction of the first laser; and encode a syntax element for a second laser, wherein the syntax element for the second laser indicates a difference between the value for the first laser and a value for the second laser, the value for the second laser indicating a number of probes in the azimuth direction of the second laser; and encode a point of the point cloud based on the number of probes in the azimuth direction of the second laser.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
a memory configured to store point cloud data; and
one or more processors coupled to the memory and implemented in circuitry, the one or more processors configured to:
obtain a value for a first laser, the value for the first laser indicating a number of probes in an azimuth direction of the first laser;
decode a syntax element for a second laser, wherein the syntax element for the second laser indicates a difference between the value for the first laser and a value for the second laser, the value for the second laser indicating a number of probes in the azimuth direction of the second laser;
determine the value for the second laser indicating the number of probes in the azimuth direction of the second laser based on the first value and the indication of the difference between the value for the first laser and the value for the second laser; and
decode a point of the point cloud data based on the number of probes in the azimuth direction of the second laser.

2. The device of claim 1, wherein the one or more processors are configured to, as part of obtaining the value for the first laser, decode a syntax element specifying the value for the first laser.

3. The device of claim 1, wherein the one or more processors are configured to, as part of decoding the point of the point cloud data:
determine, based on the number of probes in the azimuth direction of the second laser, a sampling location of the second laser in a node containing a point of the one or more points;
determine a context based on the sampling location;
decode one or more bins of an azimuth offset syntax element indicating an azimuth offset of the point by applying context adaptive binary arithmetic coding (CABAC) decoding using the determined context; and
determine a position of the point based on the azimuth offset syntax element.

4. The device of claim 1, wherein the one or more processors are configured to, as part of decoding the point of the point cloud data:

determine, based on the number of probes in the azimuth direction of the second laser, a sampling location of the second laser in a node containing the point;
determine a context based on the sampling location;
decode a syntax element indicating a position of a plane passing through the node containing the point by applying context adaptive binary arithmetic coding (CABAC) decoding using the determined context; and
determine a position of the point based on the position of the plane.

5. The device of claim 1, further comprising a display to present imagery based on the point cloud data.

6. The device of claim 1, wherein the value for the first laser indicates a number of probes in the azimuth direction for one full rotation of the first laser and the value for the second laser indicates a number of probes in the azimuth direction for one full rotation of the second laser.

7. A device comprising:
a memory configured to store point cloud data; and
one or more processors coupled to the memory and implemented in circuitry, the one or more processors configured to:
obtain the point cloud data;
determine a value for a first laser, the value for the first laser indicating a number of probes in an azimuth direction of the first laser;
encode a syntax element for a second laser, wherein the syntax element for the second laser indicates a difference between the value for the first laser and a value for the second laser, the value for the second laser indicating a number of probes in the azimuth direction of the second laser; and
encode a point of the point cloud data based on the number of probes in the azimuth direction of the second laser.

8. The device of claim 7, wherein the one or more processors are further configured to encode a syntax element specifying the value for the first laser.

9. The device of claim 7, wherein the one or more processors are configured to, as part of encoding the point of the point cloud:
determine, based on the number of probes in the azimuth direction of the second laser, a sampling location of the second laser in a node containing the point;
determine a context based on the sampling location; and
encode one or more bins of an azimuth offset syntax element indicating an azimuth offset of the point by applying context adaptive binary arithmetic coding (CABAC) encoding using the determined context.

10. The device of claim 7, wherein the one or more processors are configured to, as part of encoding the point of the point cloud data:
determine, based on the number of probes in the azimuth direction of the second laser, a sampling location of the second laser in a node containing a point of the one or more points;
determine a context based on the sampling location; and
encode a syntax element indicating a position of a plane passing through the node containing the point by applying context adaptive binary arithmetic coding (CABAC) encoding using the determined context.

11. The device of claim 7, wherein the value for the first laser indicates a number of probes in the azimuth direction for one full rotation of the first laser and the value for the second laser indicates a number of probes in the azimuth direction for one full rotation of the second laser.

12. The device of claim 7, further comprising a sensor to generate the point cloud data.

13. A method of decoding point cloud data, the method comprising:
obtaining a value for a first laser, the value, for the first laser indicating a number of probes in an azimuth direction of the first laser;
decoding a syntax element for a second laser, wherein the syntax element for the second laser indicates a difference between the value for the first laser and a value for the second laser, the value for the second laser indicating a number of probes in the azimuth direction of the second laser;
determining the value for the second laser indicating the number of probes in the azimuth direction of the second laser based on the first value and the indication of the difference between the value for the first laser and the value for the second laser; and
decoding a point of the point cloud data based on the number of probes in the azimuth direction of the second laser.

14. The method of claim 13, wherein obtaining the value for the first laser comprises decoding a syntax element specifying the value for the first laser.

15. The method of claim 13, wherein decoding the point of the point cloud data based on the number of probes in the azimuth direction of the second laser comprises:
determining, based on the number of probes in the azimuth direction of the second laser, a sampling location of the second laser in a node containing a point of the one or more points;
determining a context based on the sampling location;
decoding one or more bins of an azimuth offset syntax element indicating an azimuth offset of the point by applying context adaptive binary arithmetic coding (CABAL) decoding using the determined context; and
determining a position of the point based on the azimuth offset syntax element.

16. The method of claim 13, wherein decoding the point of the point cloud data based on the number of probes in the azimuth direction of the second laser comprises:
determining, based on the number of probes in the azimuth direction of the second laser, a sampling location of the second laser in a node containing the point;
determining a context based on the sampling location;
decoding a syntax element indicating a position of a plane passing through the node containing the point by applying context adaptive binary arithmetic coding (CABAC) decoding using the determined context; and
determining a position of the point based on the position of the plane.

17. The method of claim 13, wherein the value for the first laser indicates a number of probes in the azimuth direction for one full rotation of the first laser and the value for the second laser indicates a number of probes in the azimuth direction for one full rotation of the second laser.

18. A method of encoding point cloud data, the method comprising:
obtaining the point cloud data;
determining a value for a first laser, the value for the first laser indicating a number of probes in an azimuth direction of the first laser;
encoding a syntax element for a second laser, wherein the syntax element for the second laser indicates a difference between the value for the first laser and a value for the second laser, the value for the second laser indicating a number of probes in the azimuth direction of the second laser; and
encoding a point of the point cloud data based on the number of probes in the azimuth direction of the second laser.

19. The method of claim 18, further comprising encoding a syntax element specifying the value for the first laser.

20. The method of claim 18, wherein encoding the point of the point cloud data based on the number of probes in the azimuth direction of the second laser comprises:
determining, based on the number of probes in the azimuth direction of the second laser, a sampling location of the second laser in a node containing the point;
determining a context based on the sampling location; and
encoding one or more bins of an azimuth offset syntax element indicating an azimuth offset of the point by applying context adaptive binary arithmetic coding (CABAC) encoding using the determined context.

21. The method of claim 18, wherein encoding the point of the point cloud data based on the number of probes in the azimuth direction of the second laser comprises:
determining, based on the number of probes in the azimuth direction of the second laser, a sampling location of the second laser in a node containing a point of the one or more points;
determining a context based on the sampling location; and
encoding a syntax element indicating a position of a plane passing through the node containing the point by applying context adaptive binary arithmetic coding (CABAC) encoding using the determined context.

22. The method of claim 18, wherein the value for the first laser indicates a number of probes in the azimuth direction for one full rotation of the first laser and the value for the second laser indicates a number of probes in the azimuth direction for one full rotation of the second laser.

23. A device for decoding point cloud data, the device comprising:
means for obtaining a value for a first laser, the value for the first laser indicating a number of probes in an azimuth direction of the first laser;
means for decoding a syntax element for a second laser, wherein the syntax element for the second laser indicates a difference between the value for the first laser and a value for the second laser, the value for the second laser indicating a number of probes in the azimuth direction of the second laser;
means for determining the value for the second laser indicating the number of probes in the azimuth direction of the second laser based on the first value and the indication of the difference between the value for the first laser and the value for the second laser; and
means for decoding a point of the point cloud data based on the number of probes in the azimuth direction of the second laser.

24. A device for encoding point cloud data, the device comprising:
means for obtaining the point cloud data;
means for determining a value for a first laser, the value for the first laser indicating a number of probes in an azimuth direction of the first laser;
means for encoding a syntax element for a second laser, wherein the syntax element for the second laser indicates a difference between the value for the first laser and a value for the second laser, the value for the second laser indicating a number of probes in the azimuth direction of the second laser; and means for encoding a point of the point cloud data based on the number of probes in the azimuth direction of the second laser.

25. A non-transitory computer-readable storage medium having stored thereon instructions that, when executed, cause one or more processors to:
  obtain a value for a first laser, the value for the first laser indicating a number of probes in an azimuth direction of the first laser;
  decode a syntax element for a second laser, wherein the syntax element for the second laser indicates a difference between the value for the first laser and a value for the second laser, the value for the second laser indicating a number of probes in the azimuth direction of the second laser;
  determine the value for the second laser indicating the number of probes in the azimuth direction of the second laser based on the first value and the indication of the difference between the value for the first laser and the value for the second laser; and
  decode a point of point cloud data based on the number of probes in the azimuth direction of the second laser.

26. A non-transitory computer-readable storage medium having stored thereon instructions that, when executed, cause one or more processors to:
  obtain point cloud data;
  determine a value for a first laser, the value for the first laser indicating a number of probes in an azimuth direction of the first laser; and
  encode a syntax element for a second laser, wherein the syntax element for the second laser indicates a difference between the value for the first laser and a value for the second laser, the value for the second laser indicating a number of probes in the azimuth direction of the second laser; and
  encode a point of the point cloud based on the number of probes in the azimuth direction of the second laser.

* * * * *